(12) United States Patent
Feeley et al.

(10) Patent No.: US 7,788,130 B2
(45) Date of Patent: Aug. 31, 2010

(54) METHOD AND PRODUCT FOR OFFERING ADVERTISING SERVICES

(75) Inventors: Michael A. Feeley, Amherst, NY (US); Joseph Holcomb, Buffalo, NY (US); Scott Bliss, Amherst, NY (US)

(73) Assignee: Kanoodle.com, Inc., Amherst, NY (US)

( * ) Notice: Subject to any disclaimer, the term of this patent is extended or adjusted under 35 U.S.C. 154(b) by 1426 days.

(21) Appl. No.: 10/954,543

(22) Filed: Sep. 30, 2004

(65) Prior Publication Data

US 2005/0065847 A1    Mar. 24, 2005

Related U.S. Application Data

(63) Continuation-in-part of application No. 10/294,144, filed on Nov. 14, 2002.

(51) Int. Cl.
    *G06Q 30/00*    (2006.01)
(52) U.S. Cl. .................................. 705/14.4; 705/14.16
(58) Field of Classification Search .................. 705/14, 705/14.4, 14.16
    See application file for complete search history.

(56) References Cited

U.S. PATENT DOCUMENTS

| | | | | |
|---|---|---|---|---|
| 5,930,474 A | * | 7/1999 | Dunworth et al. ........... | 709/217 |
| 6,385,592 B1 | * | 5/2002 | Angles et al. ............... | 705/14 |
| 6,487,538 B1 | * | 11/2002 | Gupta et al. ................ | 705/14 |
| 6,629,135 B1 | * | 9/2003 | Ross et al. .................. | 709/218 |
| 6,968,513 B1 | * | 11/2005 | Rinebold et al. ............ | 715/854 |
| 7,054,857 B2 | * | 5/2006 | Cunningham et al. ....... | 707/3 |
| 7,136,875 B2 | * | 11/2006 | Anderson et al. ........ | 707/104.1 |
| 2003/0033292 A1 | * | 2/2003 | Meisel et al. ................ | 707/3 |
| 2003/0212648 A1 | * | 11/2003 | Cunningham et al. ....... | 707/1 |
| 2005/0203835 A1 | * | 9/2005 | Nhaissi et al. ............... | 705/39 |

OTHER PUBLICATIONS

Business Editors, Affinity Hosting Offers Free Domain Name Registration and a Free, Customized Web Page, Aug. 27, 1998, Business Wure, Mew Your, p. 1.*

* cited by examiner

*Primary Examiner*—Jeffrey D Carlson
*Assistant Examiner*—Colleen Hoar
(74) *Attorney, Agent, or Firm*—Hodgson Russ LLP

(57) ABSTRACT

A method of offering advertising services to a client for advertising a client website on the Internet comprises the steps of enabling a website-related services partner to cause an opt-in object to be displayed on a partner or reseller affiliate website through which the client may choose to establish an Internet advertising services account without leaving the affiliate website, receiving corresponding client information from the affiliate, and using the received client information to establish the Internet advertising services account. The invention also covers a related computer system for performing the method. Generated revenue is preferably shared among the advertising services provider, the partner, and the affiliate.

22 Claims, 22 Drawing Sheets

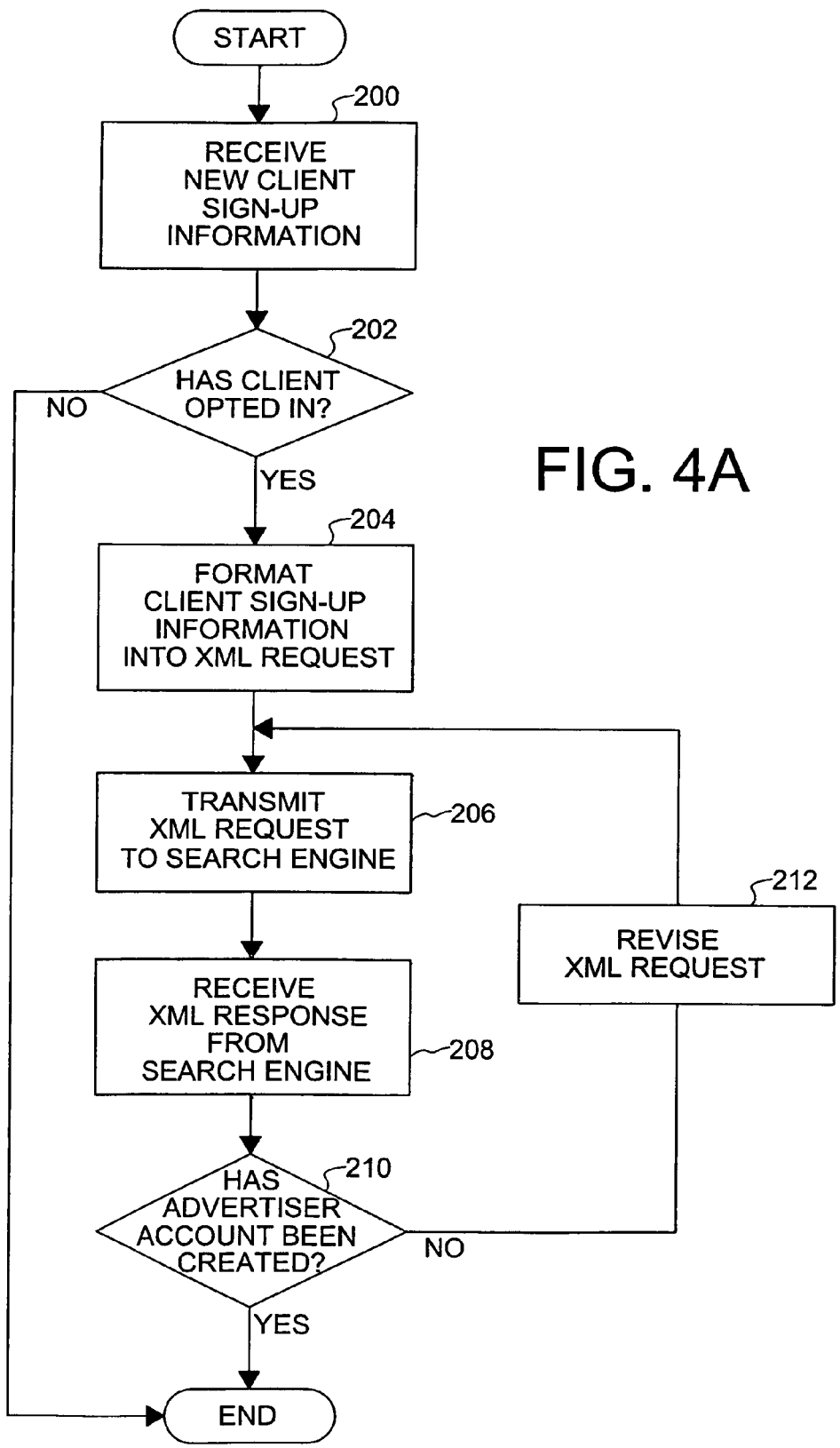

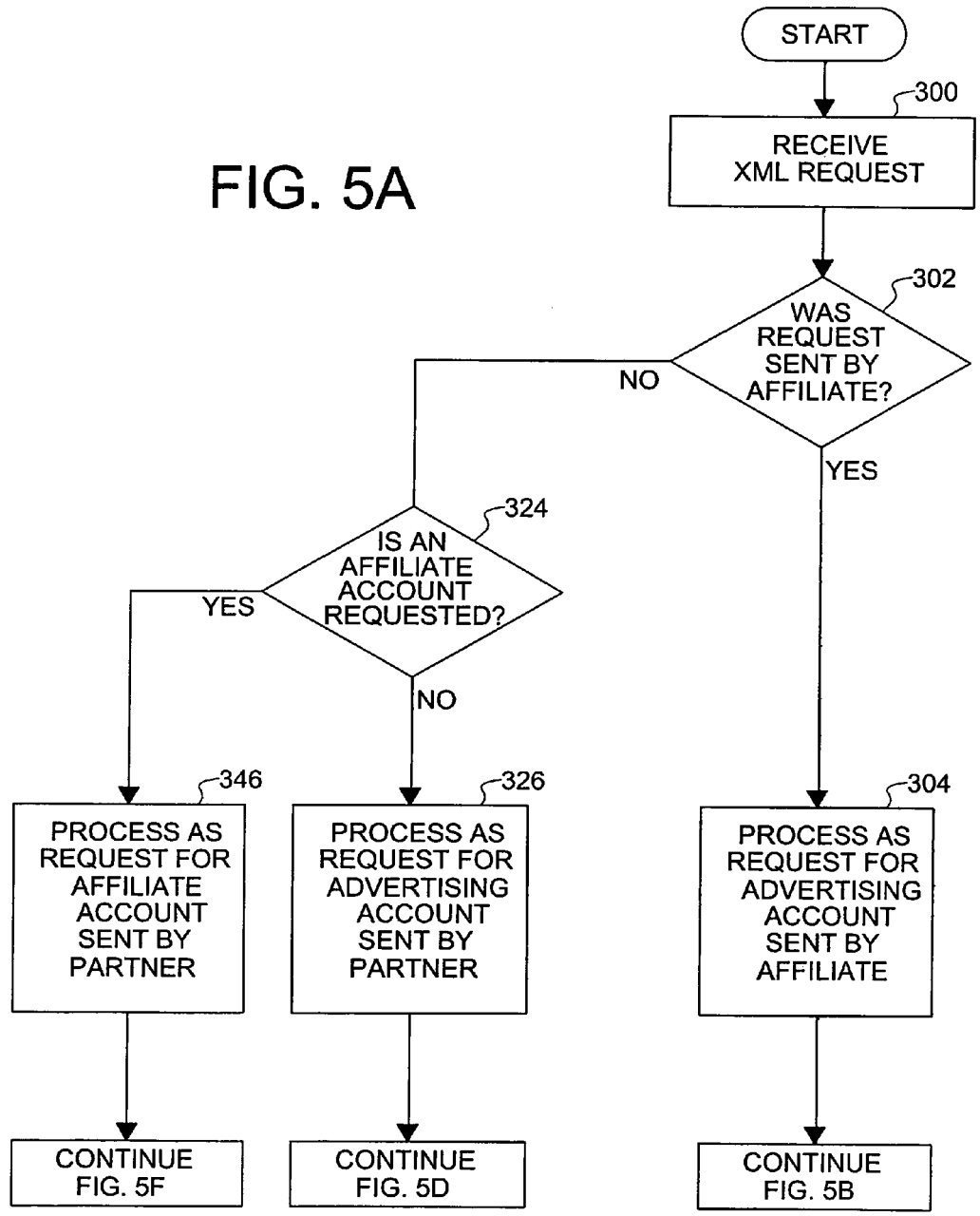

METHOD AND PRODUCT FOR OFFERING ADVERTISING SERVICES

CROSS-REFERENCE TO RELATED APPLICATIONS

The present application claims benefit under 35 U.S.C. §120 as a continuation-in-part of U.S. patent application Ser. No. 10/294,144 filed Nov. 14, 2002, the disclosure of which is hereby incorporated by reference.

FIELD OF THE INVENTION

The present invention relates generally to electronic commerce conducted over the Internet, and more particularly to a business method by which a search engine service or other advertiser service can register new advertising accounts in cooperation with partners and affiliates.

BACKGROUND OF THE INVENTION

The transfer of information over computer networks has become an increasingly important means by which institutions, corporations, and individuals do business. Computer networks have grown over the years from independent and isolated entities established to serve the needs of a single group into vast Internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange information. The Internet continues to serve its original purposes of providing access to and exchange of information among government agencies, laboratories, and universities for research and education. In addition, the Internet has rapidly become a global electronic marketplace of goods and services. This transformation of the Internet into a global marketplace was driven in large part by the introduction of an information system known as the World Wide Web ("the web"). The web is a unique distributed database designed to give wide access to a large universe of documents. The database records of the web are in the form of documents known as "pages", with one or more related pages forming a "website". Web pages reside on web servers and are accessible via the Internet. The web is therefore a vast database of information dispersed across countless individual computer systems that is constantly changing and has no recognizable organization. Computers connected to the Internet may access the web pages via a program known as a browser, which typically has a graphical user interface. One powerful technique supported by web browsers is known as hyperlinking, which permits web page authors to create links to other web pages which users can then retrieve by using simple point-and-click commands on the web browser.

Web pages may be constructed in any one of a variety of formatting conventions, such as Hyper Text Markup Language (HTML), and may include multimedia information content such as graphics, audio, and moving pictures. Any person with a computer and a connection to the Internet may access any publicly accessible page posted on the web. Thus, a presence on the World Wide Web has the capability to introduce a worldwide base of consumers to businesses, individuals, and institutions seeking to advertise their products and services to potential customers. Furthermore, the ever increasing sophistication in the design of web pages, made possible by the exponential increase in data transmission rates and computer processing speeds, makes the web an increasingly attractive medium for advertising and other business purposes, as well as for the free flow of information. The widely recognized importance of gaining a presence on the World Wide Web has led to the proliferation of "web hosts" which provide services and web servers for establishing and maintaining web pages and websites for clients. Thus, for example, a business client setting up a commercial website would contact a web host to host the website, with the web host charging an initial fee and monthly subscription fee. The web host typically has its own website enabling clients to sign-up for web-hosting services over the Internet. Also, resellers of web-hosting and other website-related services have emerged, as have affiliates of web-hosts and other website related service providers, such that clients sign-up with the reseller or affiliate who has a relationship with the actual web host or website-related services provider.

The availability of powerful new tools that facilitate the development and distribution of Internet content has led to a proliferation of information, products, and services offered on the Internet and dramatic growth in the number of consumers using the Internet. As a result, directories and search engines have been developed to index and search the information available on the web and thereby help Internet users locate information of interest. These search services enable consumers to search the Internet for a listing of websites or web pages based on a specific topic, product, or service of interest.

Search services are, after e-mail, the most frequently used tool on the Internet. As a result, websites providing search services have offered advertisers significant reach into the Internet audience and have given advertisers the opportunity to target consumer interests based on keyword or topical search requests. In a web-based search on an Internet search engine, a user enters a search term comprising one or more keywords, which the search engine then uses to generate a listing of web pages that the user may access via a hyperlink. Many search engines and website directories rely upon processes for assigning results to keywords that often generate irrelevant search results. The automated search technology that drives many search engines implements complex database search algorithms that select and rank web pages based on multiple criteria such as keyword density and keyword location. In addition, search engines that use automated search technology to catalog search results generally rely on invisible website descriptions, or "meta tags", that are authored by website promoters. Website owners may freely tag their sites as they choose. Consequently, some website promoters insert popular search terms into their website meta tags that are not relevant to the website, because by doing so they may attract additional consumer attention at little to no marginal cost. Finally, many different websites can have similar meta tags, and search engines of the type described above are simply not equipped to prioritize results in accordance with consumers' preferences.

Search engines and website directories may also rely on the manual efforts of limited editorial staffs to review web page information. Because comprehensive manual review and indexing of an unpredictable, randomly updated database such as the web is an impossible task, search engine results are often incomplete or out-of-date. Moreover, as the volume and diversity of Internet content has grown, on many popular web search sites, consumers must frequently click-through multiple branches of a hierarchical directory to locate websites responsive to their search request, a process that is slow and unwieldy from the consumer's standpoint.

Furthermore, the use of banner advertising for generating website traffic follows traditional advertising approaches and fails to utilize the unique attributes of the Internet. In the banner advertising model, website promoters seeking to promote and increase their web exposure often purchase space on the pages of popular commercial websites. The website promoters usually fill this space with a colorful graphic, known as a banner, advertising their own website. The banner may act as a hyperlink to the promoter's site. Like traditional advertising, banner advertising on the Internet is typically priced on an impression basis with advertisers paying for exposures to potential consumers. Banners may be displayed at every page access, or, on search engines, may be targeted to search terms. Nonetheless, impression-based advertising inefficiently exploits the Internet's direct marketing potential, as the click-through rate, the rate of consumer visits a banner generates to the promoter's website, may be quite low. Website promoters are therefore paying for exposure to many consumers who are not interested in the product or service being promoted, as most visitors to a website seek specific information and may not be interested in the information announced in the banner. Likewise, the banner often fails to reach interested individuals, since the banner is not generally searchable by search engines and the interested persons may not know where on the web to view the banner.

One approach that has emerged to help web page owners target their web exposure and distribute information to the attention of interested consumers on a current and comprehensive basis is the "bid-for-position" search engine (also known as "bid-for-location" and "pay-per-click" search engine). Under this approach, website owners or promoters maintain an account with the bid-for-position search engine and register respective competitive bid amounts on keywords related to web page or website content. Search results are returned by the bid-for-position search engine in an order determined by the competitive bids, with the website of the high bidder for the searched keyword being listed first and so on. Accordingly, under the bid-for-position model, website promoters can control the placement of their website link in search result listings so that their link is prominent in searches that are relevant to the content of their website. Because advertisers and promoters must pay for each click-through referral coming from the search result listing generated by the bid-for-position search engine, they have an incentive to select and bid on those search keywords that are most relevant to their website offerings and content. The higher an advertiser's position on a search result list, the higher likelihood of a "referral"; that is, the higher the likelihood that a consumer will be referred to the advertiser's website through the search result list. The openness of this advertising marketplace is further facilitated by publicly displaying, to consumers: and other advertisers, the price bid by an advertiser on a particular search result listing.

At present, a website owner who signs up as a client of a web host or reseller mayor may not be aware of the benefits of registering with search engines, particularly bid-for-position search engines, to increase traffic of interested consumers to its website. Moreover, if the website owner does register with a search engine, much of the same client information provided to the web host at the time of sign-up must again be provided to the search engine. Similar to web hosts and resellers, search engines have websites for signing up clients, in this case to advertising accounts.

Thus, it would be beneficial to clients to offer advertising services for promoting the client's website at the time the client signs up for web-hosting services, and to streamline the sign-up process for the client so that signing up for advertising services involves little or no extra work.

SUMMARY OF THE INVENTION

The present invention is embodied by a method for offering advertising services to a client for advertising a client website on the Internet. The method is carried out with the cooperation of a partner having a partner website visited by the client for website-related services, such as web-hosting. The method comprises the steps of causing an opt-in object to be displayed on the partner website through which the client may choose to establish an Internet advertising services account without leaving the partner website; receiving client information from the partner, wherein the client information corresponds to the client who has chosen to establish an Internet advertising services account through the opt-in object; and using the received client information to establish the Internet advertising services account. In one implementation of the method, the partner receives the client information through a client sign-up form on the partner's website, and the sign-up form includes an opt-in object, such as a checkbox, through which the client indicates whether an advertising account is desired. To encourage partner participation, the search engine preferably shares revenue it receives from the client for providing advertising services with the partner.

The invention is embodied by another method for offering advertising services to a client with the cooperation of a partner and an affiliate, wherein the partner has a partner website that sells website-related services and the affiliate has an affiliate website for reselling the website-related services to the client. This method comprises the steps of enabling the partner to cause an opt-in object to be displayed on the affiliate website through which the client may choose to establish an Internet advertising services account without leaving the affiliate website; receiving client information from the affiliate, wherein the client information corresponds to the client who has chosen to establish an Internet advertising services account through the opt-in object; and using the received client information to establish the Internet advertising services account. As an incentive for partner and affiliate participation, the search engine preferably shares advertising revenue from the account with both the partner and the affiliate.

The present invention also encompasses computer systems for implementing the methods summarized above.

BRIEF DESCRIPTION OF THE DRAWINGS

The nature and mode of operation of the present invention will now be more fully described in the following detailed description of the invention taken with the accompanying drawing figures, in which:

FIG. 4A is a flow chart illustrating programming code execution associated with a partner or affiliate website when the website receives uploaded client information in accordance with an embodiment of the present invention;

FIGS. 5A-5G together form a flow chart illustrating programming code execution associated with a search engine website when the search engine website receives a request from a partner or affiliate in accordance with an embodiment of the present invention;

DETAILED DESCRIPTION OF THE INVENTION

Figure 1:
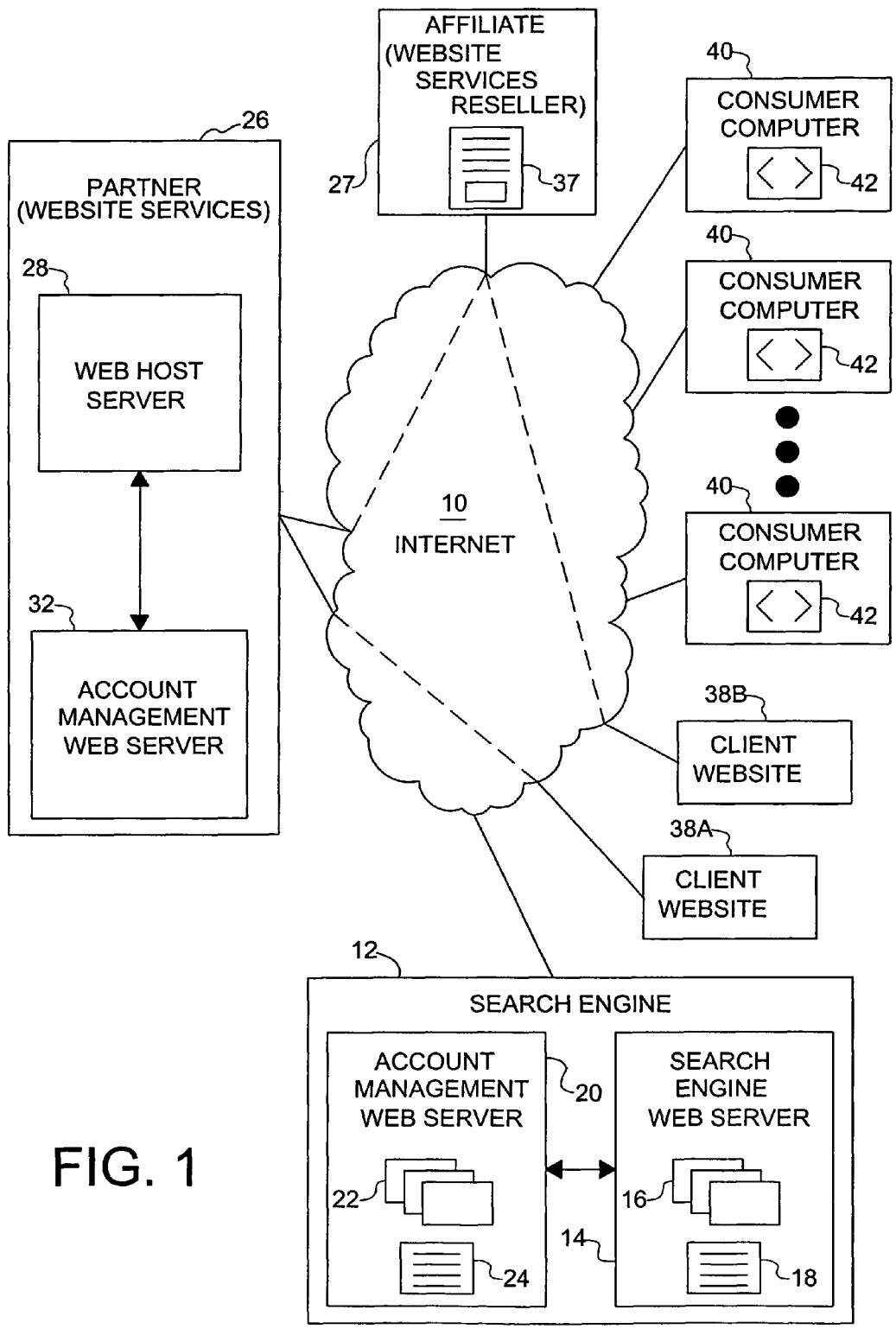
FIG. 1 is a schematic diagram of a computer network system embodying the present invention.

From time to time in the present description, in order to facilitate understanding, a reference numeral identifying a website of a particular party will also be used to denote the party itself. For example, a search engine website and a search engine (the party running the search engine website) will be identified by reference numeral 12; a partner website and a partner (the party running the partner website) will be identified by reference numeral 26; and an affiliate website and an affiliate (the party running the affiliate website) will be identified by reference numeral 27.

Referring initially to FIG. 1 of the drawings, a computer network system is shown schematically as including a bid-for-position search engine website 12, a partner website 26, an affiliate website 27, a first client website 38A, a second client website 38B, and a plurality of consumer computers 40, all of which are interconnected through the Internet 10. As used herein, the term "website" includes hardware, software, and/or stored document files used to provide a presence on the World Wide Web and to communicate with other websites. Search engine website 12 is shown as having a search engine web server 14 and an account management web server 20 connected to the search engine web server to exchange information therewith. Search engine web server 14 stores a search engine database 16 and programming for generating a search engine web page 18 on which search results are displayed. Account management web server 20 stores an accounts database 22 and programming for generating a secure account web page 24.

Partner website 26 is preferably a source of website-related services, such as web-hosting services, that can be provided either directly to a client (as in the case of first client website 38A) or resold through affiliate website 27 to a client (as in the case of second client website 38B) for hosting the client's website. For sake of this specification, and to assist in understanding the present invention, it is assumed that partner website 26 provides web-hosting services, that affiliate website 27 resells web-hosting services provided by partner website 26, and that client websites 38A and 38B are commercial websites trying to attract consumers. Accordingly, the proprietors of client websites 38A and 38B would benefit by having their websites listed in search results provided by search engine website 12 in response to relevant keyword searches. For example, if client website 38A sells SCUBA diving gear and SCUBA diving travel packages, then it would benefit by having a link appear in a list of search results generated by the search engine website 12 when a consumer enters the search term (keyword) "SCUBA" to drive interested traffic to its website.

Partner website 26 includes a web host server 28 and an account management web server 32 connected to web host server 28 to exchange information therewith. Web host server 28 stores programming for generating client websites 38A and 38B that promote or offer goods and/or services, or provide other information which can be accessed over the Internet 10 by members of the public using consumer computers 40 running executable browser software 42. A client can visit partner website 26 or affiliate website 27 to establish and maintain a commercial website (i.e. client website 38A or 38B). The client can also open an advertising account with search engine 12 to drive traffic to its website. Members of the public using consumer computers 40 may visit the search engine web page 18 to run a keyword search that returns a list of matching links to various websites, including client website 38A and/or 38B, from search engine database 16.

Figure 2:
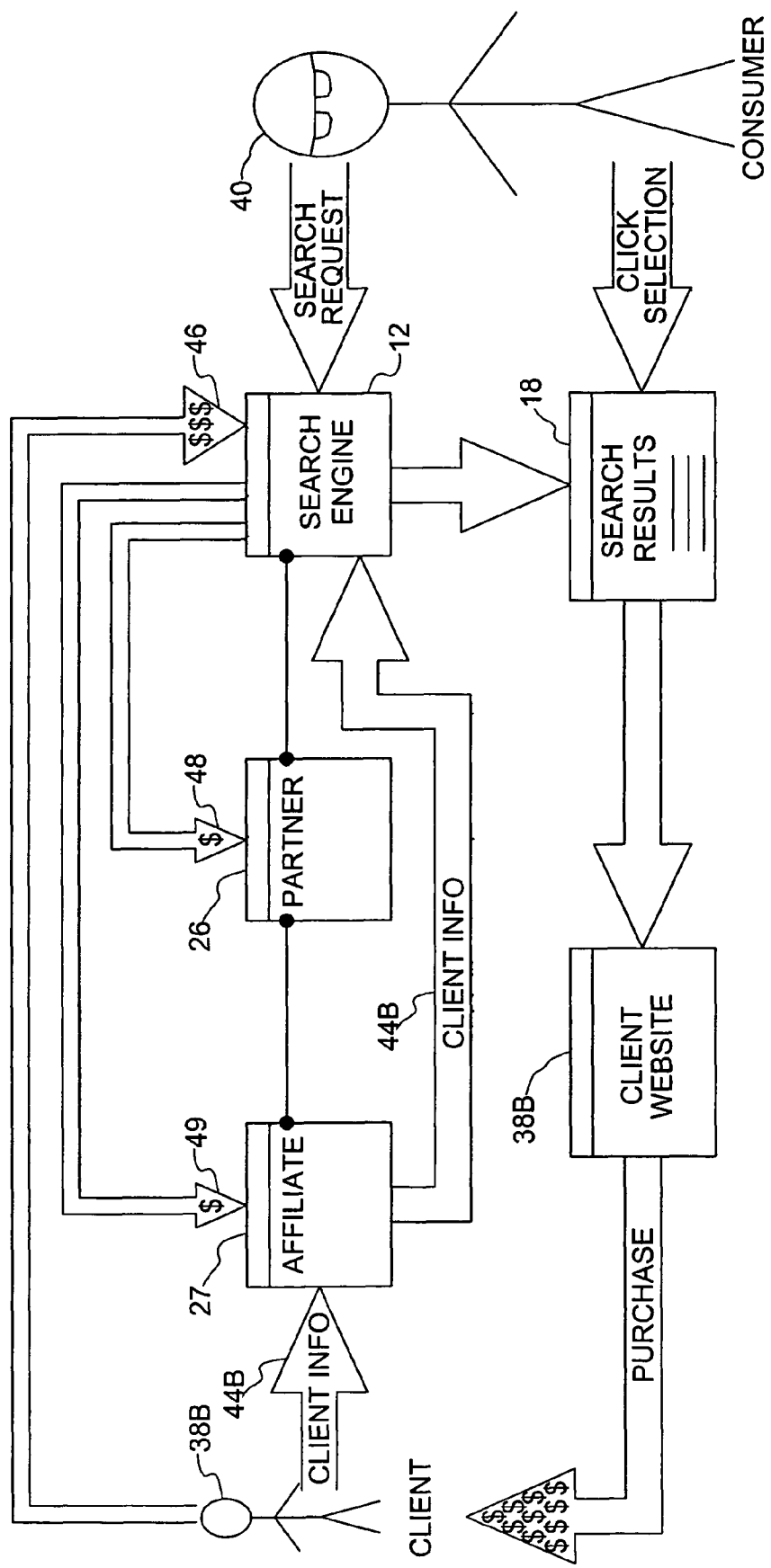
FIG. 2 is a schematic diagram illustrating a business method in accordance with the present invention.
Figure 3:
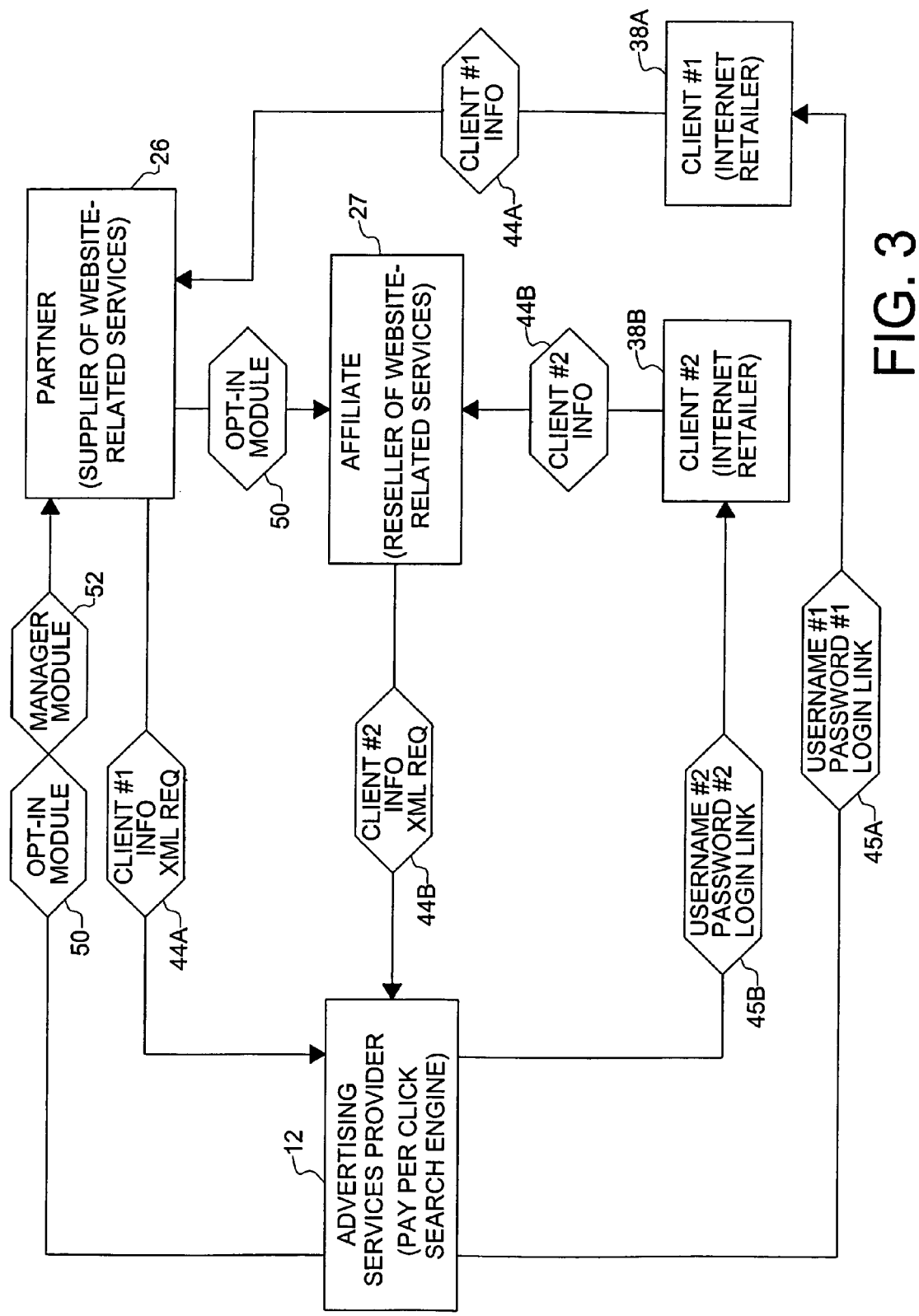
FIG. 3 is another schematic diagram further illustrating the business method.

FIGS. 2 and 3 illustrate a business method according to the present invention by which an advertising service provider, such as search engine 12, can offer advertising services to a client for advertising a client website 38A or 38B on the Internet. In general terms, search engine 12 cooperates with partner 26 and affiliate 27 to offer advertising services to clients who visit affiliate website 27 to sign up for website-related services, such as web-hosting services, that originate from partner 26 and are resold by affiliate 27. More specifically, search engine 12 transmits or otherwise provides an opt-in software module 50 and a manager software module 52 to partner 26. The opt-in software module 50 enables partner 26 to display an opt-in object on the partner website through which a direct client 38A of the partner may choose to establish an Internet advertising services account with search engine 12 without leaving the partner website. The manager software module 52 enables partner 26 to provide the opt-in software module 50 to affiliate 27, whereby the affiliate can display an opt-in object on its website so that a client 38B of the affiliate may choose to establish an Internet advertising services account with search engine 12 without leaving the affiliate website. By way of non-limiting example, the opt-in object may simply be a check-box displayed next to a suitable offer message, whereby the client may click the check-box to indicate acceptance of the offer.

When client 38A signs up for web-hosting services with partner 26, the client uploads client information 44A for receipt by the partner. At the time client 38A signs up with partner 26, or subsequently when the client revisits partner website 26 to manage its web-hosting account with the partner, the offer to establish an advertising services account with search engine 12 can be accepted by the client through the opt-in object displayed on the partner website. Similarly, when client 38B signs up for web-hosting services with reseller affiliate 27, the client uploads client information 44B for receipt by the affiliate. At the time client 38B signs up with affiliate 27, or subsequently when the client revisits affiliate website 27 to manage its web-hosting account with the affiliate, the offer to establish an advertising services account with search engine 12 can be accepted by the client through the opt-in object displayed on the affiliate website. The changed value of the opt-in object is uploaded to partner 26 in the case of client 38A, or to affiliate 27 in the case of client 38B, and programming code provided as part of the opt-in software module formats the client information 44A or 44B and transmits the client information to search engine 12 for use in establishing an Internet advertising services account for the client. As used herein, the term "client information" is intended to be broadly construed, and may include name, address, and telephone information, e-mail address information, information for identifying the client's website, and credit card information. It is also noted that the term "client information" as used herein refers only to that information used by search engine 12 to open an advertising account, it being realized that possibly not all the information provided by the client to partner 26 or affiliate 27 is necessary for opening an advertising account.

FIG. 2 illustrates a manner in which revenue 46 received by search engine 12 from client 38B as a result of the Internet advertising services account is distributed in accordance with the present invention. In particular, revenue 46 is shared by search engine 12 with affiliate 27 and partner 26 in return for the cooperation of the affiliate and partner. The level of sharing can be agreed upon by the parties; for example search engine 12 might keep 60% of revenues and distribute 20% to affiliate 27 and 20% to partner 26. Consequently, partner 26 has incentive to enlist and deliver opt-in module 50 to as many cooperating affiliates 27 as possible. While FIG. 2 shows two-tiered cooperation including a partner and an affiliate, it is also possible to practice the invention in a one-tiered arrangement involving only the partner 26, for instance where partner 26 provides web-hosting services directly to client 38A. In a one-tiered arrangement, revenue is split in an agreed manner between search engine 12 and partner 26. Of course, it is also possible to practice the invention using more than two tiers by providing affiliate 27 with manager module 52 enabling affiliate 27 to enlist a plurality of lower level affiliates, wherein the revenue is shared among a greater number of parties, and so on.

As mentioned above, search engine 12 establishes an Internet advertising services account for client 38A using client information 44A received from partner 26, and another Internet advertising services account for client 38B using client information 44B received from affiliate 27. Accordingly, search engine 12 assigns a username and a password to each established advertising account and informs the client of the assigned username and password. In a preferred embodiment of the invention, account information, including the username and password, is transmitted to the client by electronic mail. Following the present description, account information 45A is transmitted to client 38A and account information 45B is transmitted to client 38B as illustrated schematically in FIG. 3.

Figure 6:
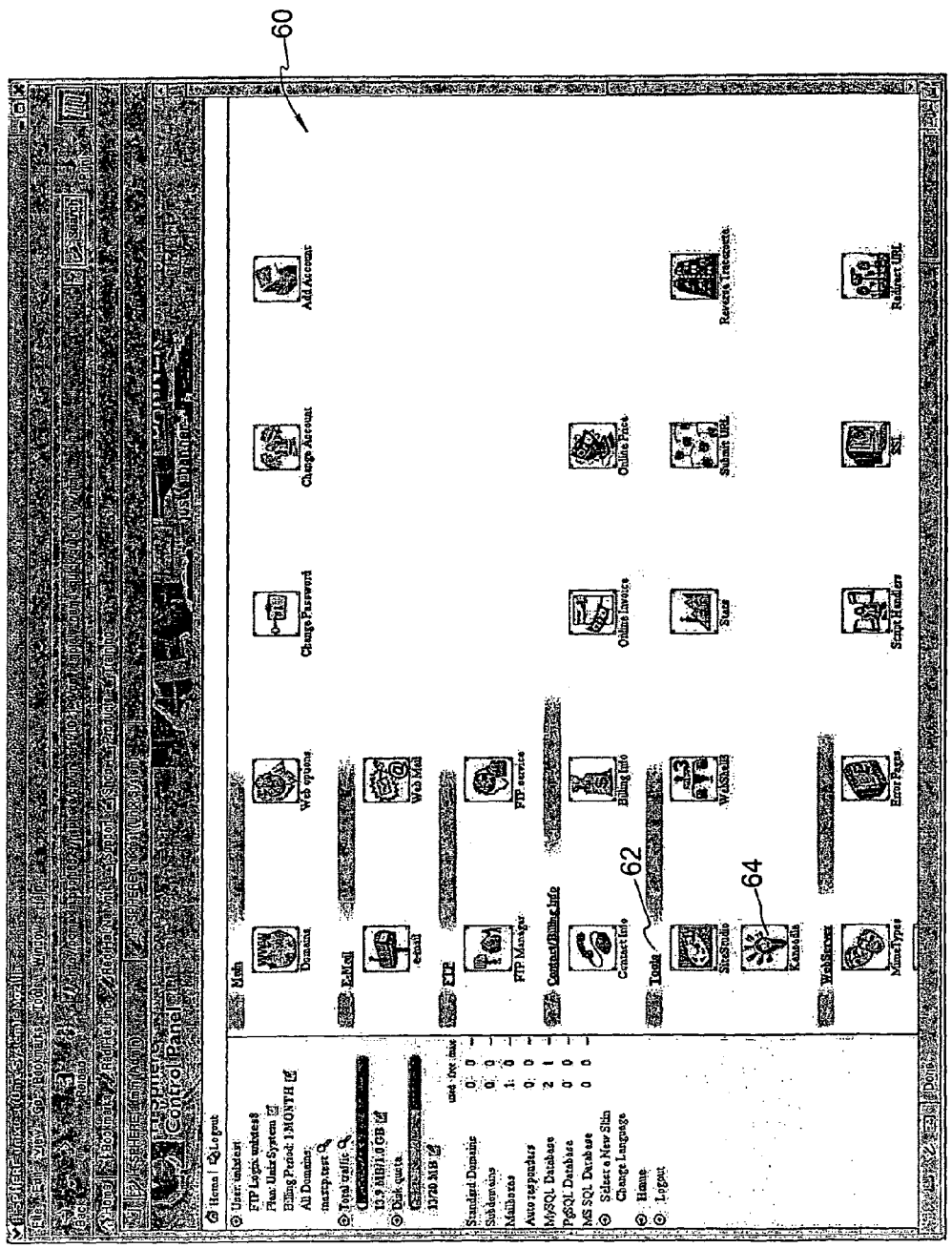
FIG. 6 is a screen capture showing a client control panel accessible by a client by visiting the affiliate website.
Figure 7:
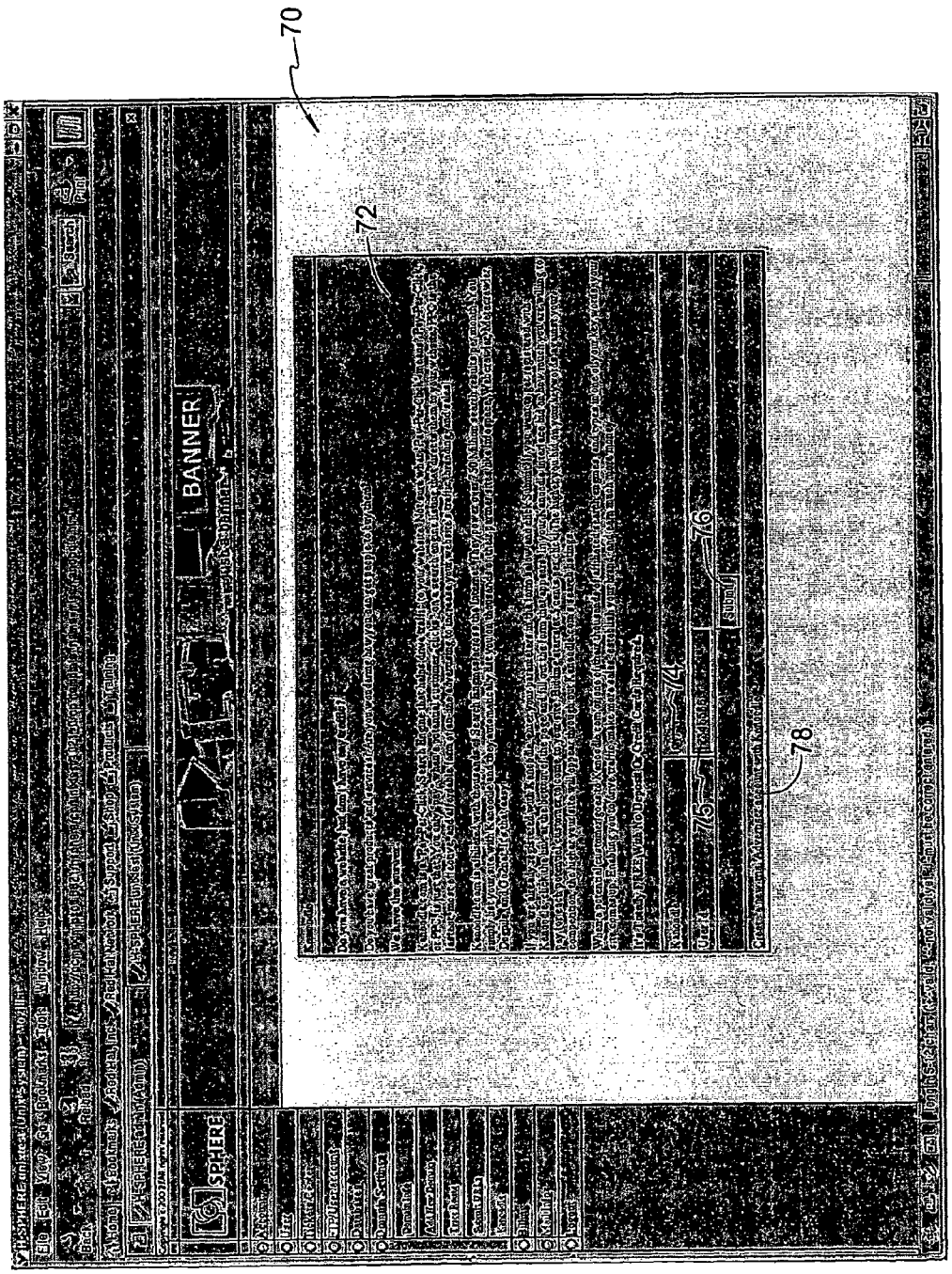
FIG. 7 is a screen capture showing a client opt-in web page of the affiliate website.
Figure 8:
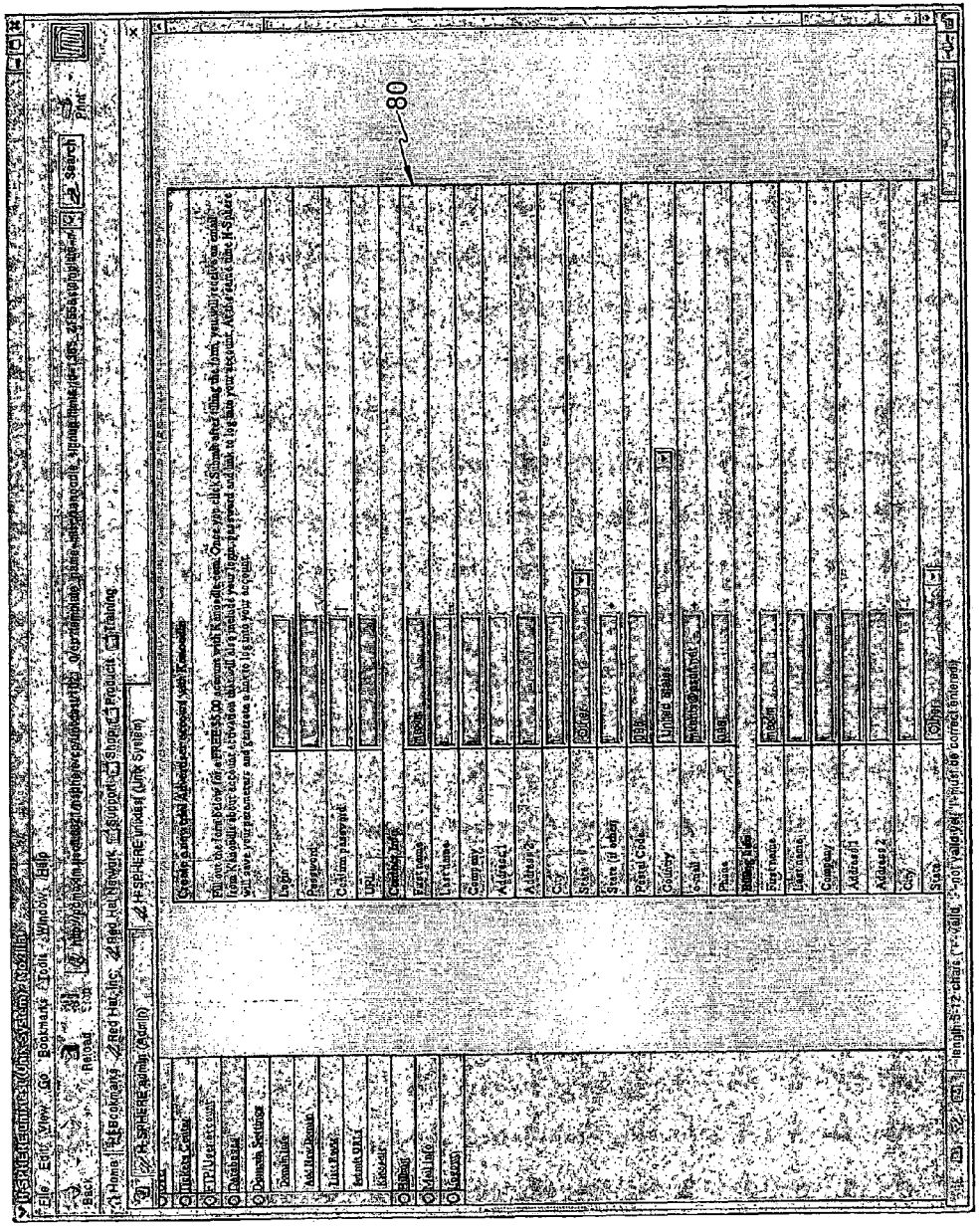
FIG. 8 is a screen capture showing a client sign-up form of the affiliate website.

FIGS. 6-8 illustrate the features provided to affiliate website 27 by opt-in software module 50. FIG. 6 shows a control panel 60 which client 38B accesses on affiliate website 27 to manage its website, which is hosted through the affiliate. As can be seen in FIG. 6, control panel 60 includes a "Tools" subpanel 62 allowing the client to select various software tools, among which is an Internet advertising account tool represented by icon 64. The icon 64 is inserted in control panel 60 by opt-in software module 50, and when it is clicked, program code is executed to display a client opt-in web page 70 as shown in FIG. 7. The client opt-in web page 70 includes a message box 72 explaining the nature of the Internet advertising services account offered by search engine 12, an opt-in object 74 which the client clicks to "ON" if the offer of an advertising services account is accepted or leaves at "OFF" if the offer is declined, a User ID text box 75 for entry of a user identification string, a "Submit" control button 76, and a hyperlink 78. Clicking hyperlink 78 causes a client sign-up form 80 to be displayed on the affiliate website as shown in FIG. 8. The client sign-up form 80 collects client information 44B that is uploaded to the affiliate 27 when "Submit" control button 76 is clicked. As will be appreciated, client 38B can accept the offer for an Internet advertising services account without having to leave affiliate website 27.

It will be realized that opt-in software module 50 installs similar features on partner website 26, so that client 38A is exposed to the offer for an advertising services account when it deals directly with partner 26 for web-hosting services.

Figure 14:
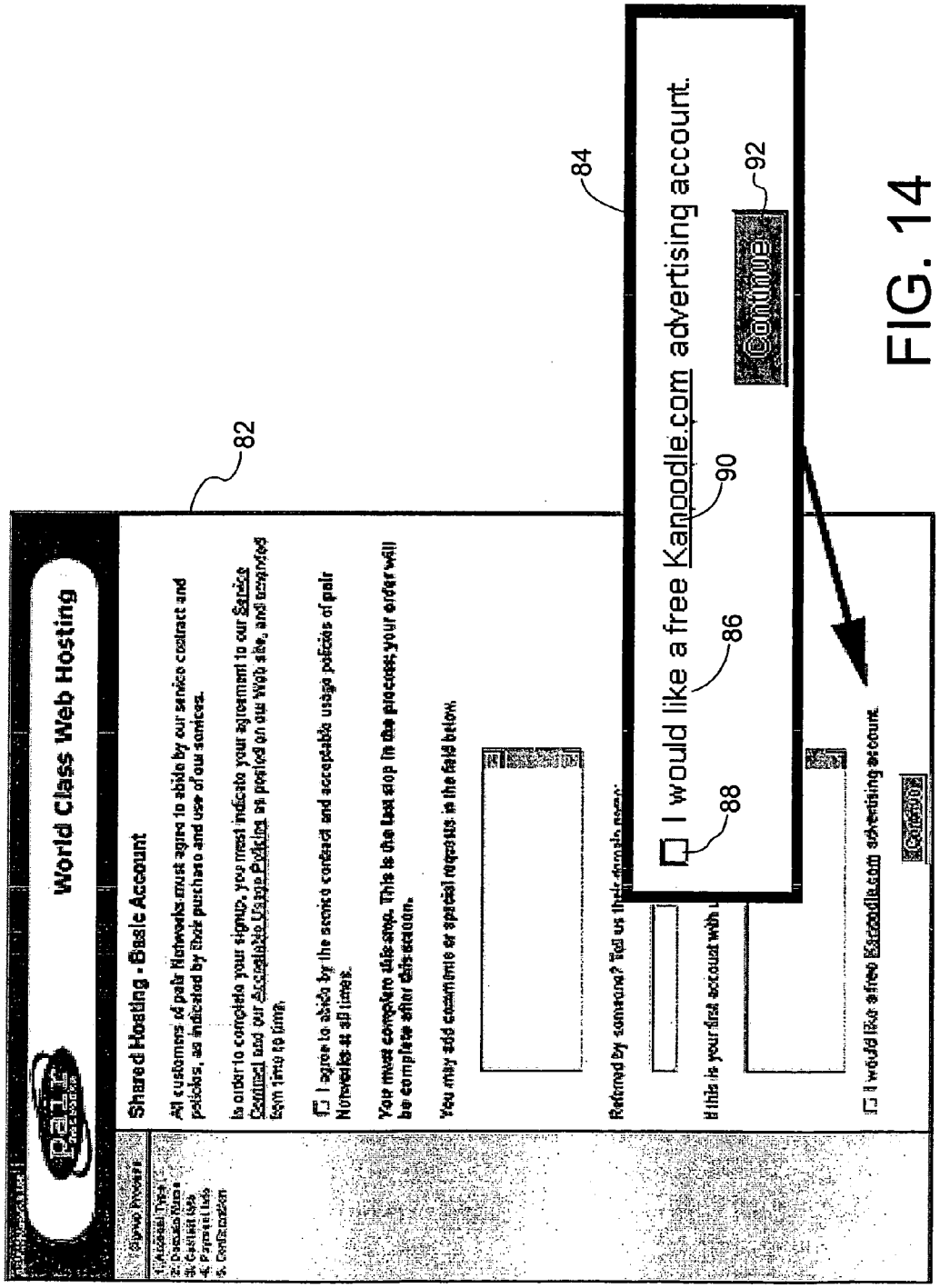
FIG. 14 is a screen capture showing a client sign-up form of either a partner website or an affiliate website, whereby the client is offered an advertising services account at the time it signs up for a website-related services account with the partner or affiliate.

It will be realized further that the placement and format of the offer and opt-in object, whether on partner website 26 or affiliate website 27, are subject to variation. For example, FIG. 14 illustrates a web-hosting account client sign-up form 82 that includes a subform 84 displayed with client sign-up form 82 by the opt-in software module 50. The subform 84 includes an advertising account prompt message 86, an opt-in object in the form of a check box 88, a hypertext link 90 to the website of search engine 12, and a "Continue" command button 92. When the client clicks the Continue command button 92 after filling out the form, the entered information is uploaded to the web-host's website (either partner 26 or affiliate 27, as the case may be). If the client wishes to accept the offer for an Internet advertising account, it merely clicks the check box 88 before clicking Continue command button 92, without having to leave the web-host's website.

Figure 12:
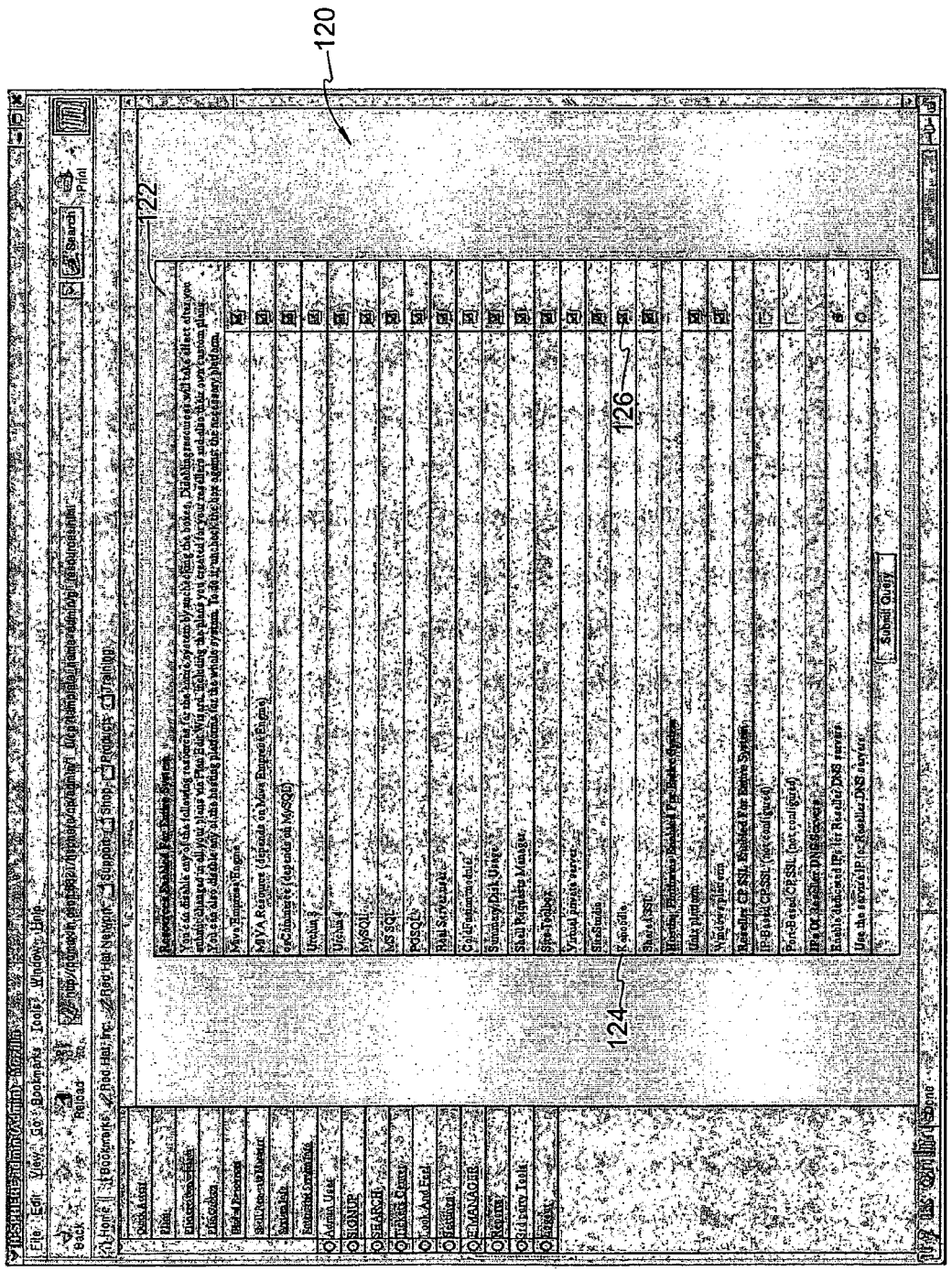
FIG. 12 is a screen capture showing an administrator global resource enabler page of the partner website.
Figure 13A:
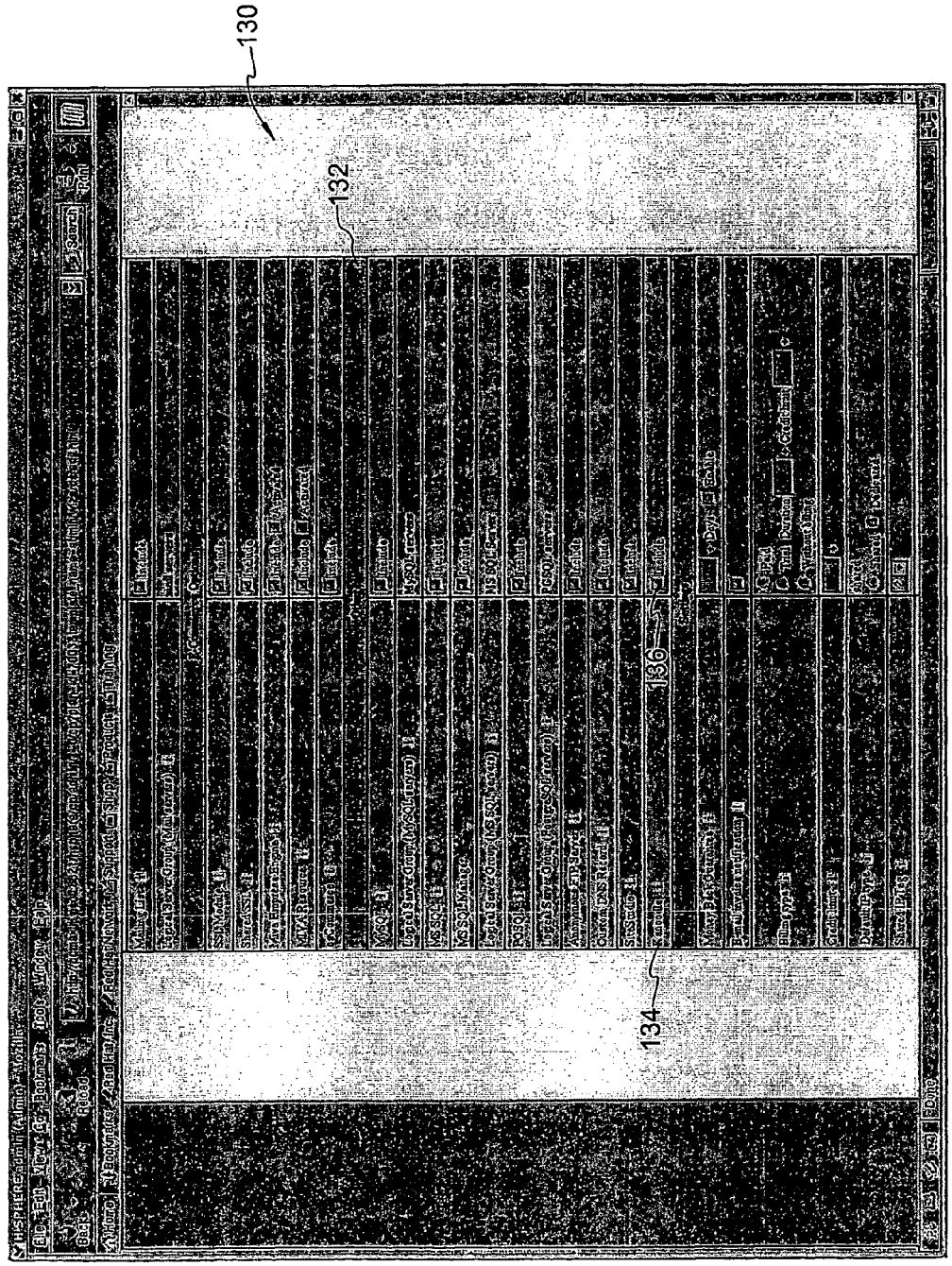
FIG. 13A is a screen capture showing an administrator resource enabler page of the partner website for windows accounts.
Figure 13B:
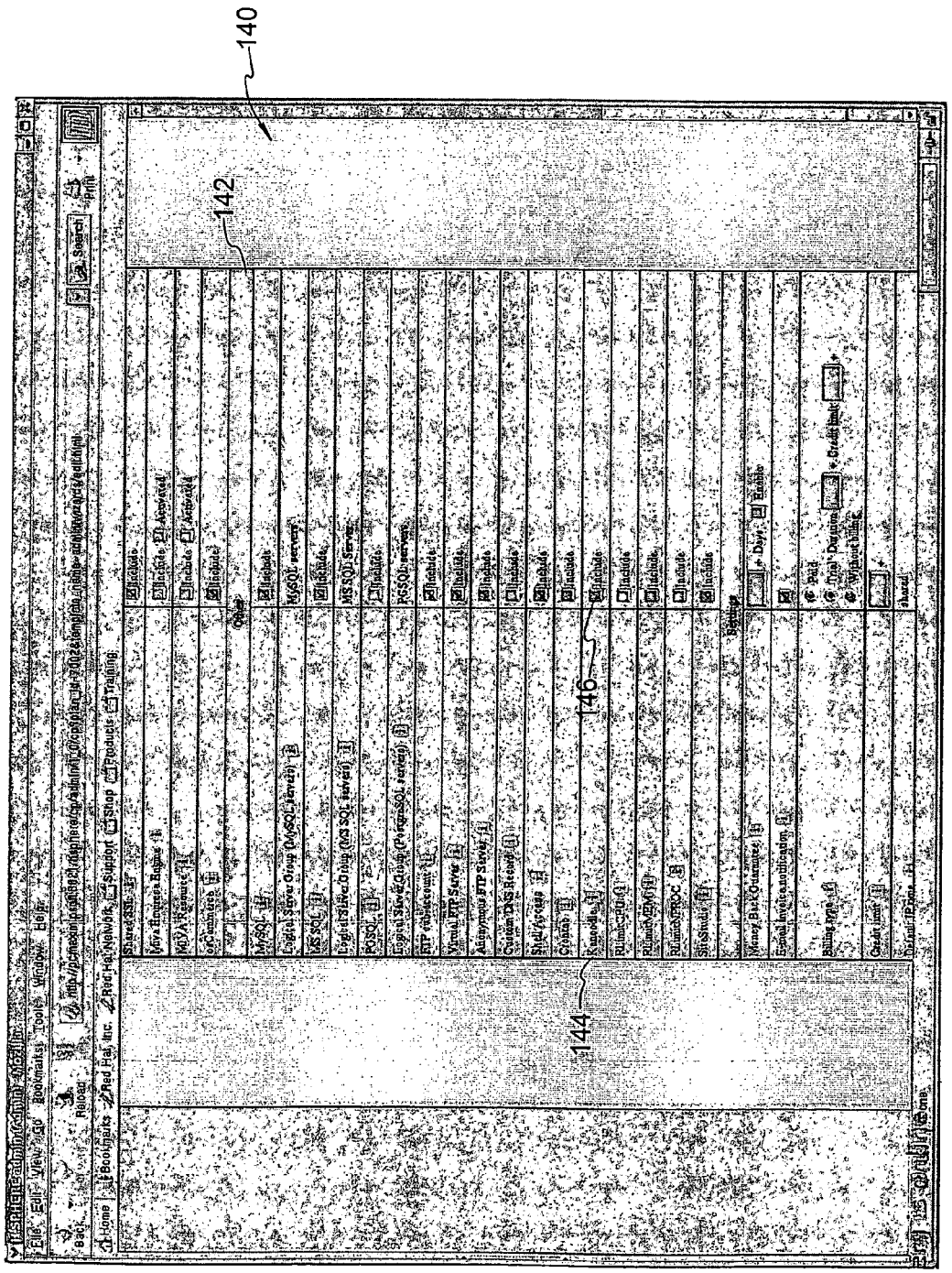
FIG. 13B is a screen capture showing an administrator resource enabler page of the partner website for UNIX/LINUX accounts.

The affiliate 27 can activate and deactivate the opt-in offer through an administrator resource enabler page of the partner website 26. FIG. 12 shows an administrator global resource enabler page 120 of the partner website that includes a resources table 122 for controlling various resources made available by the affiliate to its clients. Resources table includes a resource listing 124 and an associated check box 126 corresponding to the offer of an advertising services account as provided by the present invention. The offer is enable by clicking check box 126 so that a check mark appears in the check box, and is disabled by clicking check box 126 so that no check mark appears in the check box. FIG. 13A shows an administrator resource enabler page 130 for windows-based accounts. Resource enabler page 130 is similar to global resource enabler page 120 and includes a resources table 132, a resource listing 134, and a check box 136 associated with resource listing 134. FIG. 13B shows an administrator resource enabler page 140 for UNIX/LINUX accounts. Resource enabler page 140 is likewise similar to global resource enabler page 120 and includes a resources table 142, a resource listing 144, and a check box 146 associated with resource listing 144.

Figure 9:
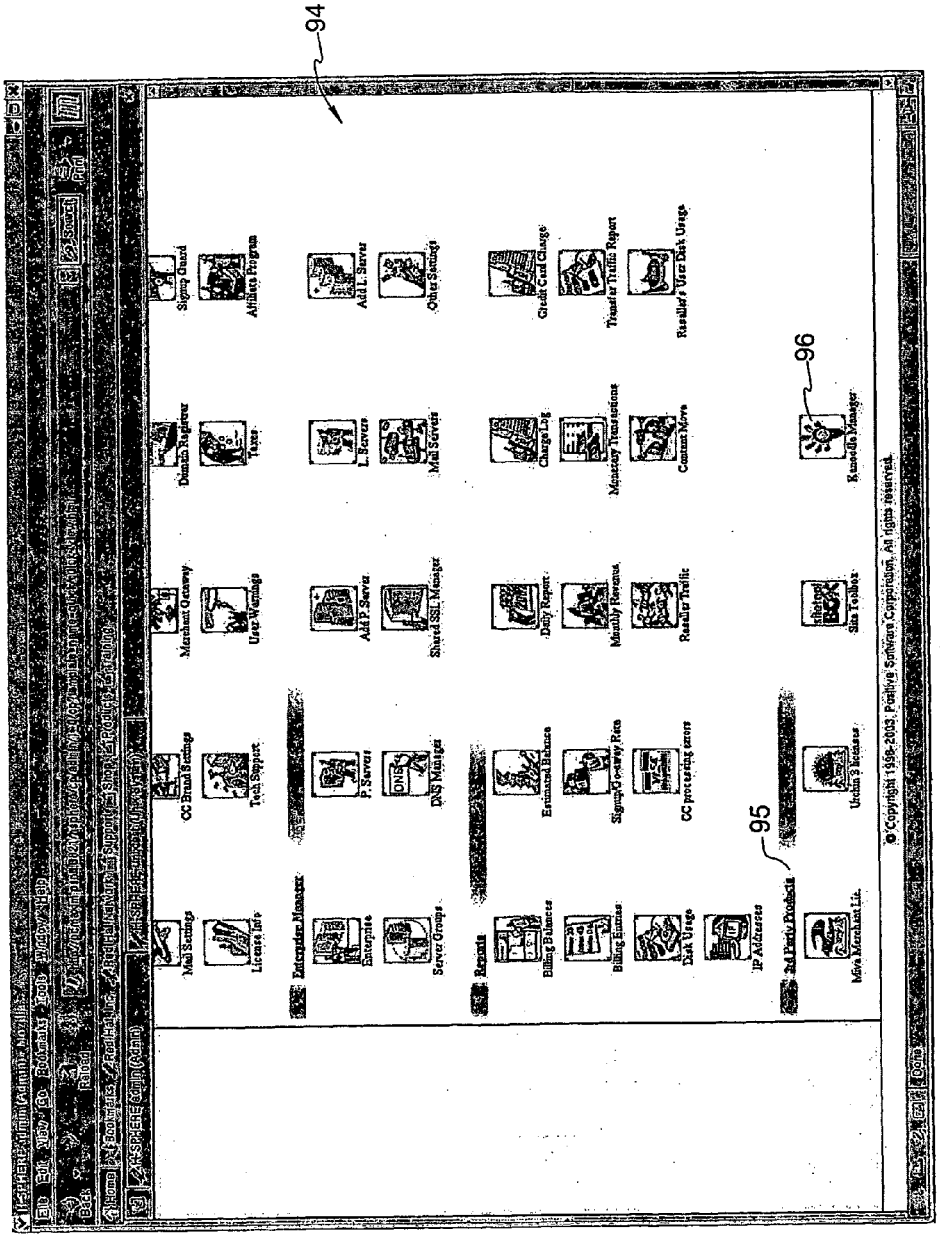
FIG. 9 is a screen capture showing an administrator control panel accessible by the affiliate by visiting the partner website.
Figure 10:
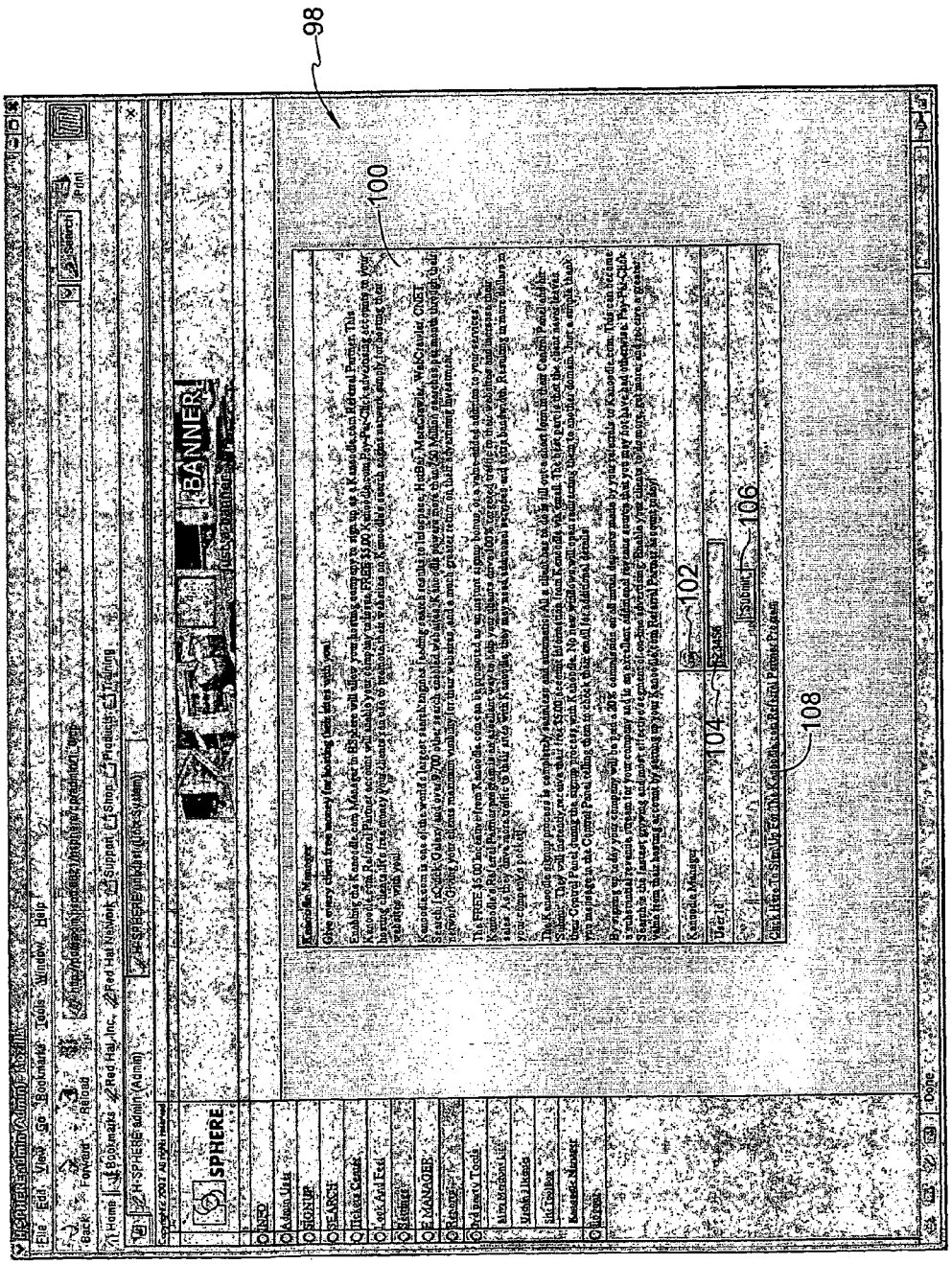
FIG. 10 is a screen capture showing an affiliate opt-in web page of the partner website.
Figure 11:
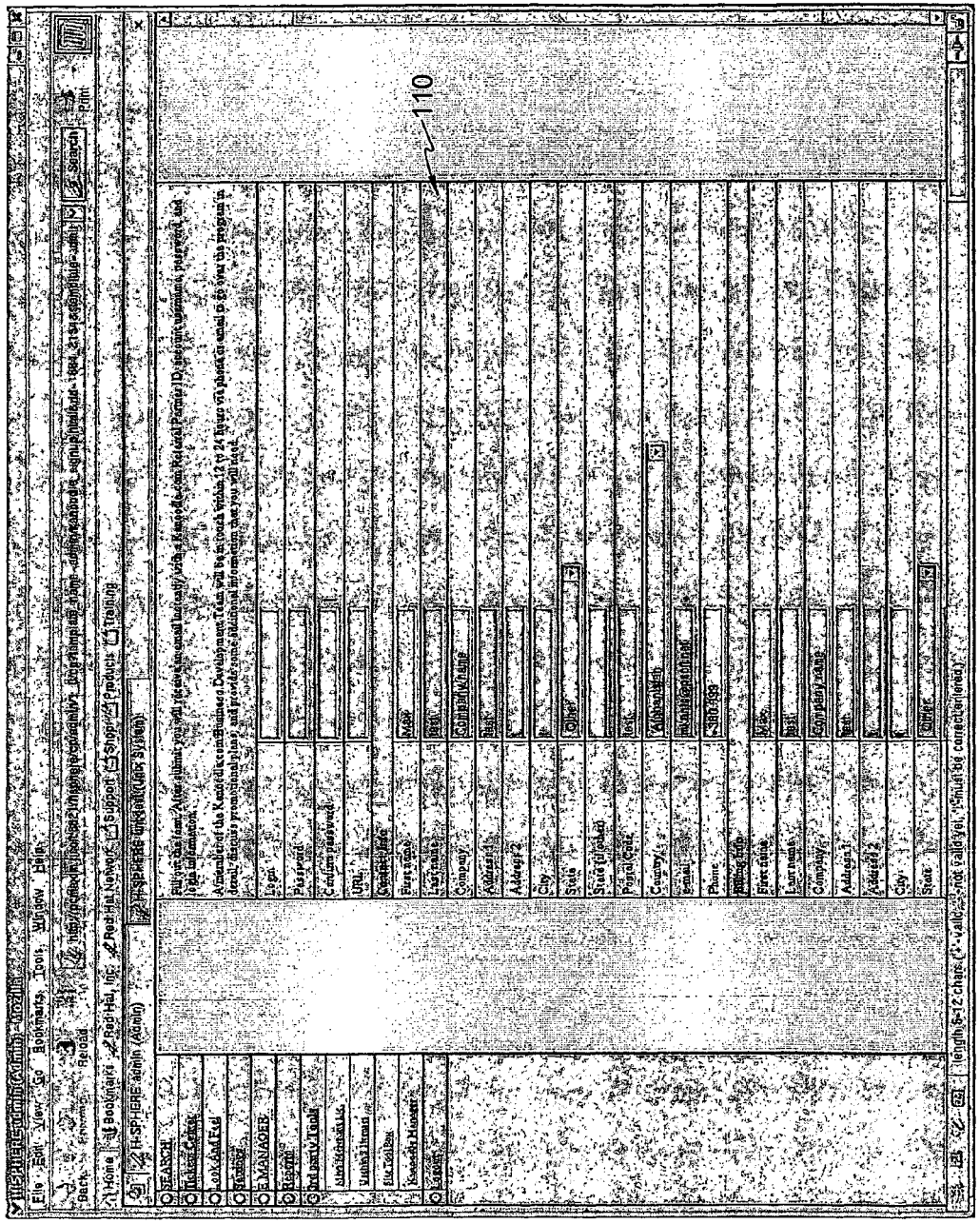
FIG. 11 is a screen capture showing an affiliate sign-up form of the partner website.

FIGS. 9-11 illustrate features provided to partner website 26 by manager software module 52 so that affiliates may be signed-up to an affiliate account in an efficient manner. FIG. 9 shows an administrator control panel 94 accessible by affiliate 27 by visiting partner website 26, whereby affiliate 27 can select various settings that impact the nature of web-hosting services the affiliate offers as a reseller. As can be seen in FIG. 9, control panel 94 includes a "3$^{rd}$ Party Products" subpanel 95 allowing the affiliate to select various software tools, among which is an affiliate account tool represented by icon 96. The icon 96 is inserted in control panel 94 by manager software module 52, and when it is clicked, program code is executed to display an affiliate opt-in web page 98 as shown in FIG. 10. The affiliate opt-in web page 98 includes a message box 100 explaining the nature of an affiliate account offered by search engine 12 in cooperation with partner 26, an opt-in object 102 which the client clicks to "ON" if the offer of an advertising services account is accepted or leaves at "OFF" if the offer is declined, a User ID text box 104 for entry of a user identification string, a "Submit" control button 106, and a hyperlink 108. Clicking hyperlink 108 causes an affiliate sign-up form 110 to be displayed on partner website 26 as shown in FIG. 11. The affiliate sign-up form 110 collects affiliate information that is uploaded to the partner 26 when "Submit" control button 106 is clicked. Thus, a prospective affiliate can accept the offer for an affiliate account without having to leave partner website 26. As will be appreciated, the method for signing up affiliates to new affiliate accounts is generally analogous to the method for signing up clients to new advertising accounts.

Figure 4B:
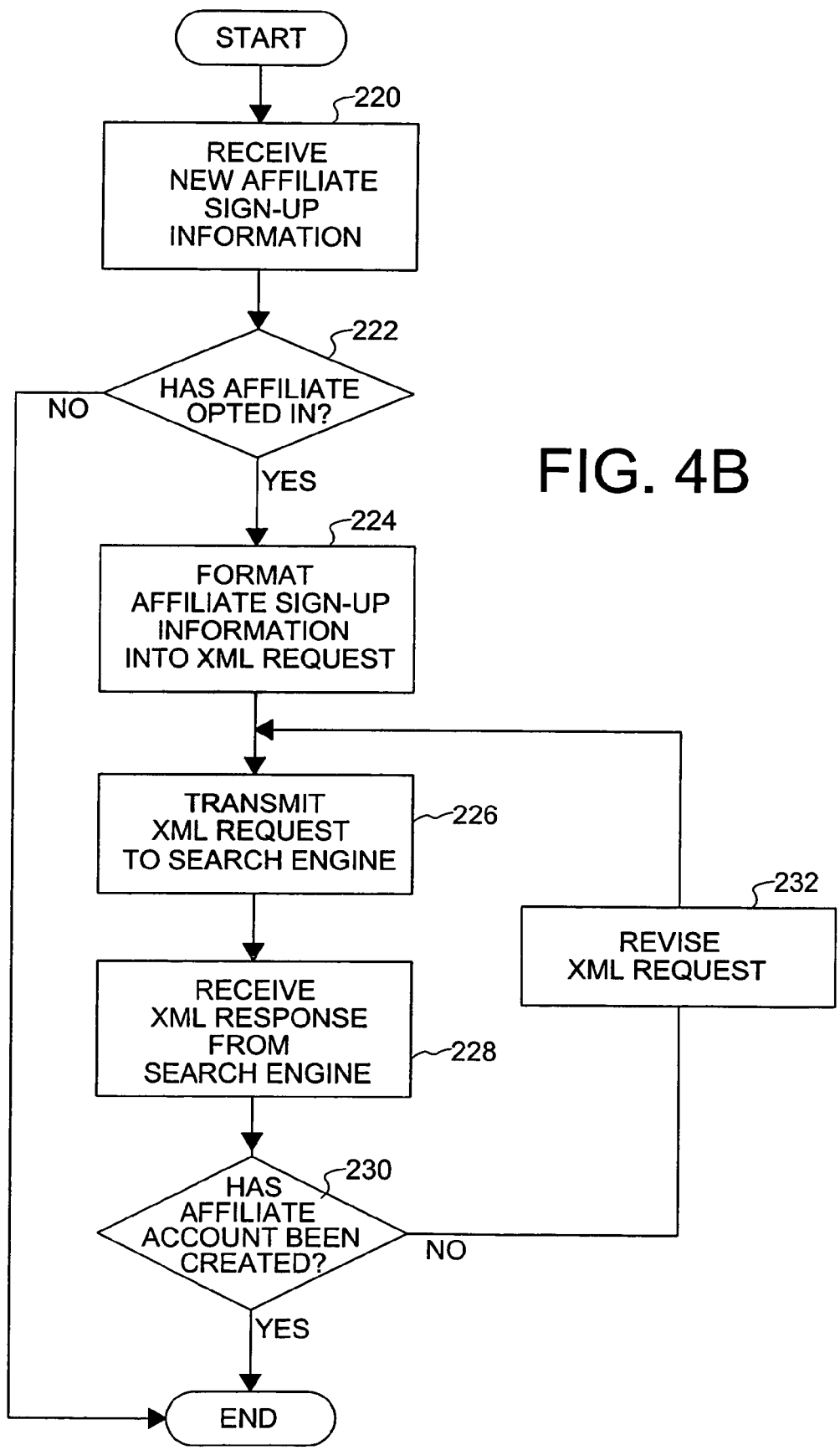
FIG. 4B is a flow chart illustrating programming code execution associated with a partner website when the partner website receives uploaded affiliate information in accordance with an embodiment of the present invention.

The flowcharts of FIGS. 4A-4B and FIGS. 5A-5G show generally the flow of programming code implementing the method of the present invention. FIG. 4A relates to executable programming code supplied as part of opt-in module 50 for formatting uploaded client information and transmitting an advertising account request, including the formatted client information, to search engine 12. FIG. 4B relates to executable programming code supplied as part of manager module 52 for formatting uploaded affiliate information and transmitting an affiliate account request, including the formatted affiliate information, to search engine 12. FIGS. 5A-5G relate to executable programming code stored by search engine 12 and run when the search engine receives either an advertising account request or an affiliate account request.

The flowchart of FIG. 4A will now be described in connection with client 38B visiting affiliate website 27, it being realized that a similar description also applies in the context of client 38A visiting partner website 26. New client sign-up information 44B is received by affiliate 27 under block 200. An inquiry 202 is run to determine whether the client has indicated a desire for an advertising account by clicking opt-in object 74 to "ON" (or by clicking check box 88 according to the alternative sign-up form of FIG. 14). If not, execution stops. If so, client information 44B is formatted into an XML request pursuant to block 204 and is transmitted via the Internet 10 to search engine 12 pursuant to block 206. Once the XML request for an advertising account has been transmitted to search engine 12, affiliate 27 awaits a response from the search engine. As described below in connection with FIGS. 5A-5G, the response from search engine 12 is preferably an XML formatted response that contains information indicating whether an advertising account was successfully created, and if not, the reason(s) why an account could not be created. The affiliate receives the XML response according to block 208 and an inquiry 210 is performed on the response information to determine if the advertising account was successfully created. If not, the original XML request is revised in block 212 based on the information contained in the search engine's response, and flow returns to block 206 causing transmission of the revised XML request to the search engine. If inquiry 210 finds that an advertising account was successfully created, then execution stops.

The flowchart of FIG. 4B illustrates execution of code in manager module 52 for formatting uploaded affiliate information and transmitting an affiliate account request, including the formatted affiliate information, to search engine 12. The code is generally analogous to the code in opt-in module 50 for formatting and transmitting uploaded client information to create an advertising account, but it applies instead to creation of an affiliate account and is executed by partner website 26. New affiliate sign-up information is received by partner 26 under block 220. An inquiry 222 is run to determine whether the affiliate has indicated a desire for an affiliate account by clicking opt-in object 102 to "ON". If not, execution stops. If so, affiliate information is formatted into an XML request pursuant to block 224 and is transmitted via the Internet 10 to search engine 12 pursuant to block 226. Once the XML request for an affiliate account has been transmitted to search engine 12, the partner 26 awaits a response from search engine 12. As described below in connection with FIGS. 5A-5G, the response from search engine 12 is preferably an XML formatted response that contains information indicating whether an affiliate account was successfully created, and if not, the reason(s) why an affiliate account could not be created. The partner 26 receives the XML response according to block 228 and an inquiry 230 is performed on the response information to determine if the affiliate account was successfully created. If not, the original XML request is revised in block 232 based on the information contained in the search engine's response, and flow returns to block 226 causing transmission of the revised XML request to the search engine. If inquiry 230 finds that an affiliate account was successfully created, then execution stops.

FIGS. 5A-5G relate to executable programming code stored and run from the system of search engine 12. An XML request transmitted by either a partner 26 or an affiliate 27 in accordance with block 206 of FIG. 4A or block 226 of FIG. 4B is received by search engine 12 in block 300. The XML request includes information identifying whether the sender is a partner or an affiliate. Under block 302, programming flow is split into two branches depending upon whether the XML request was sent by a partner 26 or an affiliate 27. If the XML request was sent to search engine 12 by partner 26, it could be either a request for an advertising account for a direct client 38A, or a request to establish an affiliate account for an affiliate 27. If, however, the XML request is sent to search engine 12 by an affiliate, then it must be a request for an advertising account from a client 38B engaging the affiliate 27 for website-related services originating from partner 26. In the latter case where the XML request was sent by an affiliate 27, the request is processed as a request for an advertising account pursuant to block 304. Accordingly, the program checks at inquiry 306 for an existing account associated with the client identified by client information 44B included in the XML request. If an existing account is detected for the client, the text of an error message is retrieved under block 307 and programming flow bypasses the account creation steps. If there is no existing account for the client, then a further test is done at 308 to determine if a username of allowable format was provided in the XML request. If not, a valid username is created and assigned at block 309. Flow proceeds to inquiry 310 to determine if a password of allowable format was provided in the XML request. If not, a valid password is created and assigned at block 311. Once a valid username and password exist, a data verification routine is called at block 312 to identify any unacceptable data values. Results of the data verification routine are checked at 314, and if the data are not verified, error message text is returned at block 315 and programming flow bypasses account creation step 316. If the data are verified, flow simply proceeds to account creation step 316 and an advertising account is created for client 38B wherein revenue generated by the account is shared by search engine 12, partner 26, and affiliate 27. Then, at block 318, the program formats an e-mail message to client 38B providing account details and instructions, including the username and password associated with the newly created advertising account, or providing an error message if account creation was not possible. The formatted e-mail message is sent to client 38B in block 320. Also, the program generates an XML response that is transmitted to partner 26 and affiliate 27 at block 322. This is the XML response received at block 208 of FIG. 4A, and it includes information indicating whether or not the advertising account was successfully created, and if not, it includes information useful in revising the original XML request.

If inquiry 302 in FIG. 5A determines that the XML request was not sent by an affiliate 27, it follows that the XML request was sent by a partner 26, and the program flow branches to inquiry 324 to determine if an affiliate account is requested. If not, then the request is for an advertising account for a client, such as client 38A, that is dealing directly with partner 26. Therefore, the XML request is processed as a request for an advertising account pursuant to block 326. The program then follows a flow similar to that described above in connection with an XML request from an affiliate. More specifically, the program checks at inquiry 328 for an existing account associated with the client identified by client information 44A included in the XML request. If an existing account is detected for the client, the text of an error message is retrieved under block 329 and programming flow bypasses the account creation steps. If there is no existing account for the client, then a further test is done at 330 to determine if a username of allowable format was provided in the XML request. If not, a valid username is created and assigned at block 331. Flow proceeds to inquiry 332 to determine if a password of allowable format was provided in the XML request. If not, a valid password is created and assigned at block 333. Once a valid username and password exist, a data verification routine is called at block 334 to identify any unacceptable data values. Results of the data verification routine are checked at 336, and if the data are not verified, error message text is returned at block 337 and programming flow bypasses account creation step 338. If the data are verified, flow simply proceeds to account creation step 338 and an advertising account is created for client 38A wherein revenue generated by the account is shared only by search engine 12 and partner 26. Then, at block 340, the program formats an e-mail message to client 38A providing account details and instructions, including the username and password associated with the newly created advertising account, or providing an error message if account creation was not possible. The formatted e-mail message is sent to client 38A in block 342. Finally, the program generates an XML response that is transmitted to partner 26 at block 344.

Figure 5B:
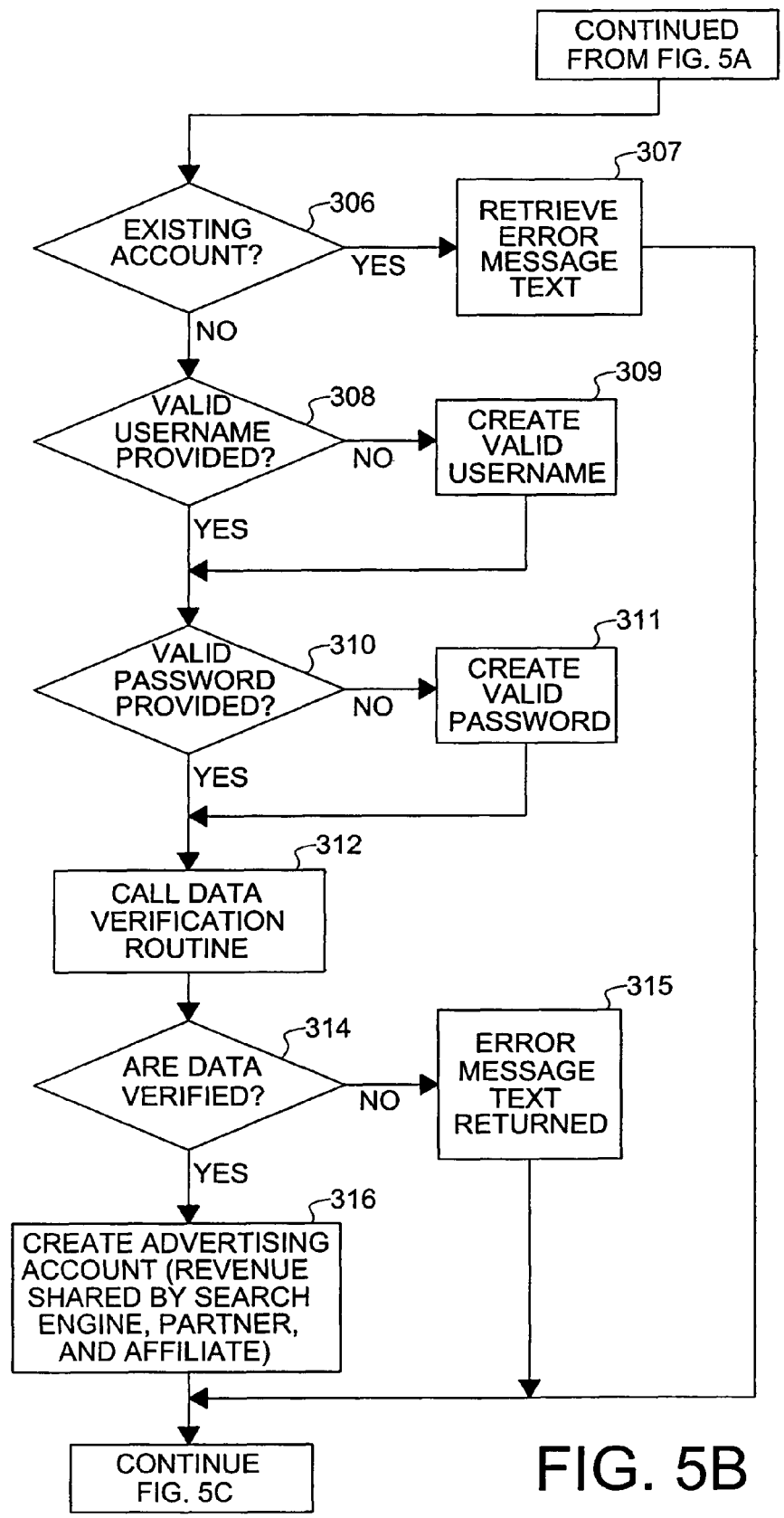
Figure 5C:
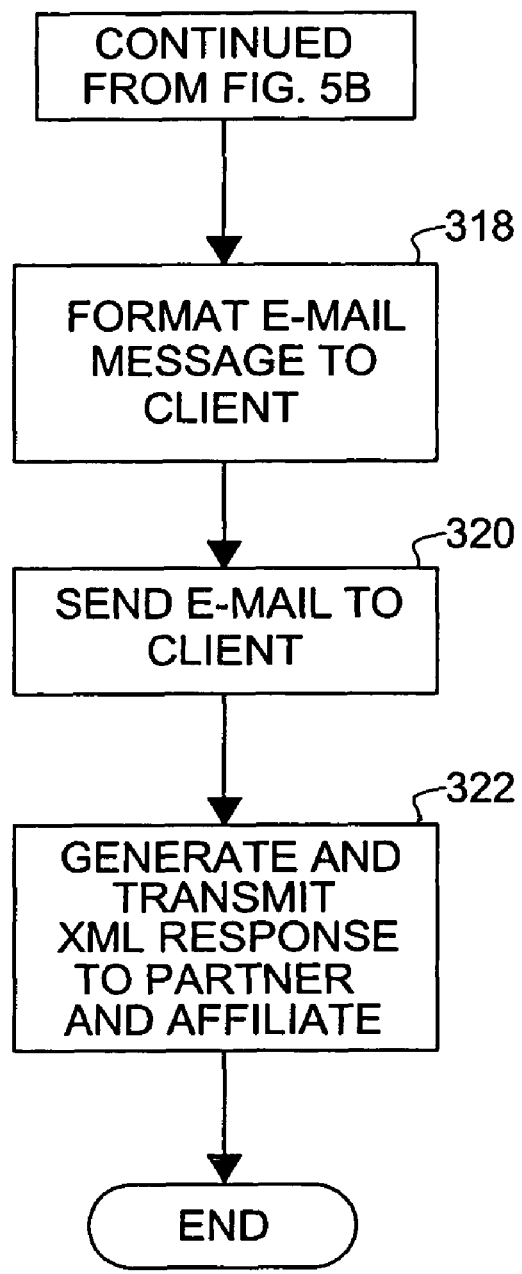
Figure 5D:
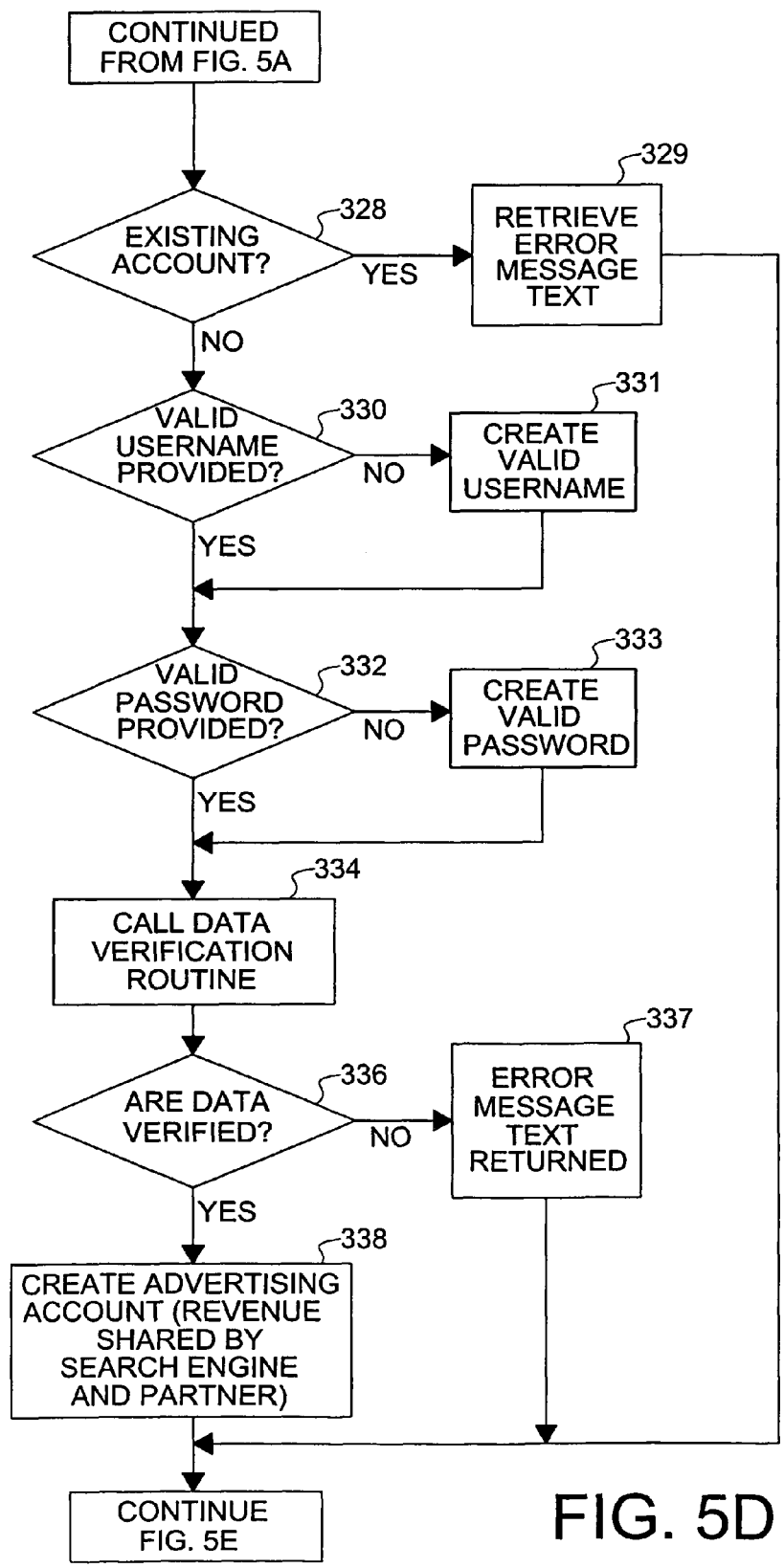
Figure 5E:
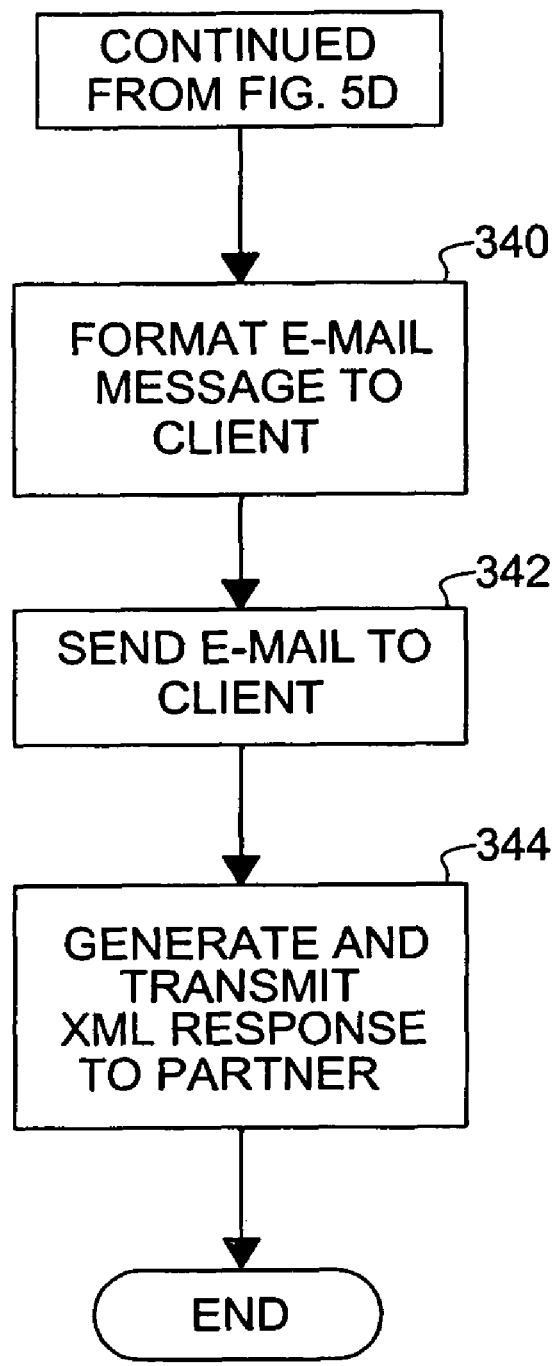
Figure 5F:
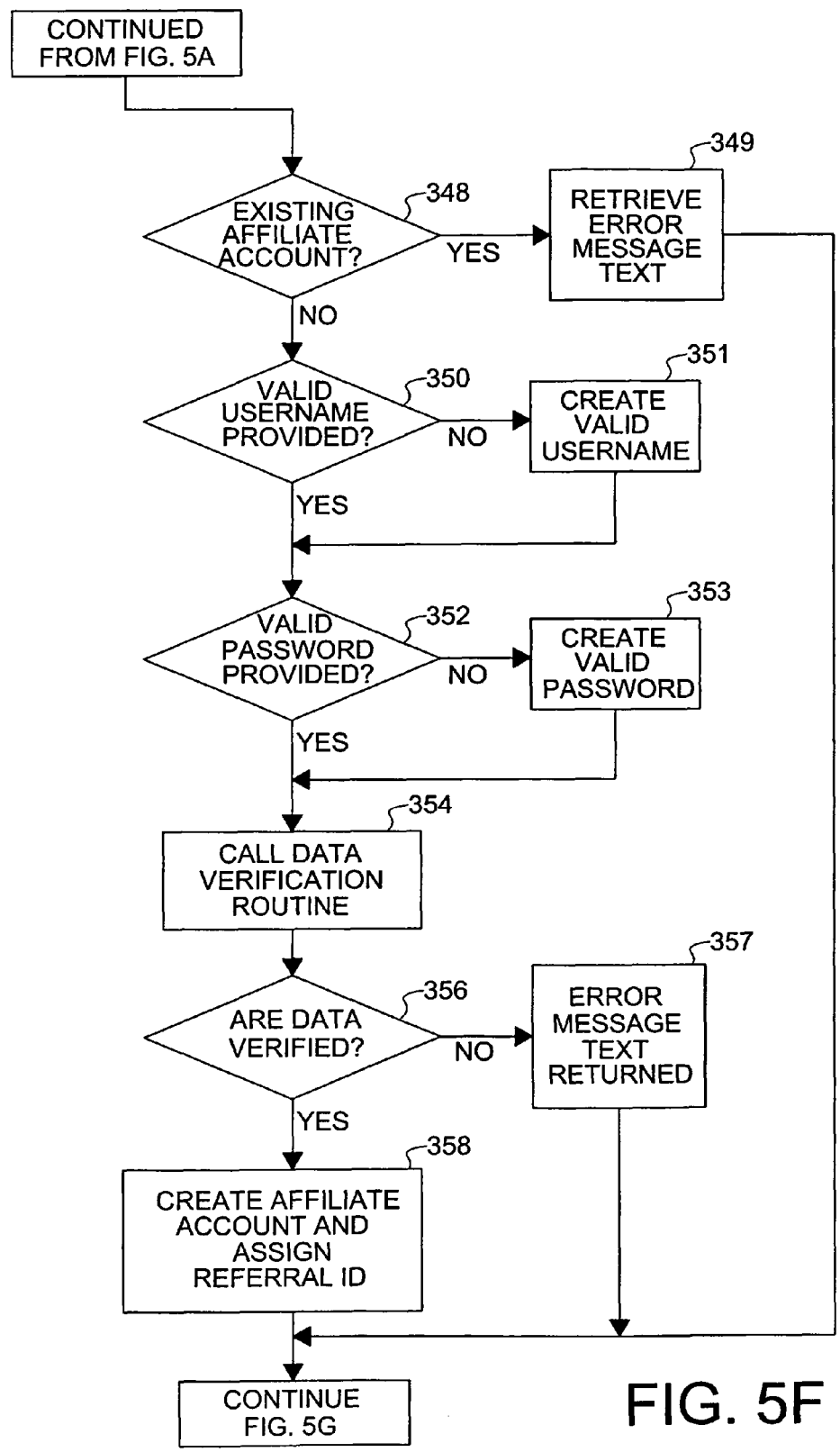
Figure 5G:
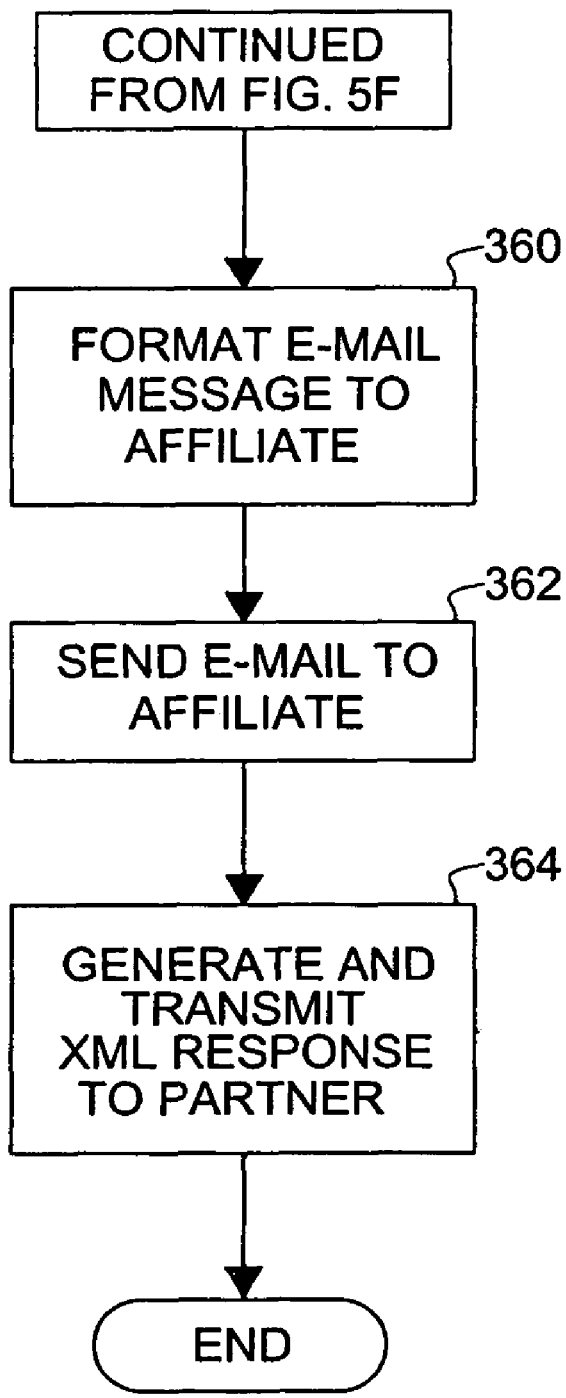

If inquiry 324 in FIG. 5A determines that an affiliate account is requested, program flow branches to block 346 and the XML request is processed as a request for an affiliate account. Referring also now to FIGS. 5F and 5G, an inquiry 348 is executed to check if an account already exists for the prospective affiliate identified in the XML request. If an existing account is detected for the prospective affiliate, the text of an error message is retrieved under block 349 and programming flow bypasses the steps for creating an affiliate account. If there is no existing account, then a further test is carried out at 350 to determine if a username of allowable format was provided in the XML request. If not, a valid username is created and assigned at block 351. Flow proceeds to inquiry 352 to determine if a password of allowable format was provided in the XML request. If not, a valid password is created and assigned at block 353. Once a valid username and password exist, a data verification routine is called at block 354 to identify any unacceptable data values. Results of the data verification routine are checked at 356, and if the data are not verified, error message text is returned at block 357 and programming flow bypasses account creation step 358. If the data are verified, an affiliate account is created and a unique referral identification code is assigned to the affiliate at block 358. Then, at block 360, the program formats an e-mail message to the new affiliate providing account details and instructions, including the username and password associated with the newly created affiliate, or providing an error message if account creation was not possible. The formatted e-mail message is sent to the new affiliate in block 362. Finally, the program generates an XML response that is transmitted to partner 26 at block 364.

In order to induce cooperation from web hosts and other website-related service providers, revenue sharing can be structured to reward partners and affiliates with a higher percentage of an initial advertising account deposit, in a manner akin to a "finder's fee", and a lower percentage of subsequent advertising account deposits by the client. This is merely one example of a possible inducement structure, and is not intended to be limiting.

To induce clients to opt-in for an advertising account, the advertising account can initially be in the form of a free "trial account" wherein search engine 12 credits the account with an initial amount so the client can evaluate the effectiveness of the advertising services.

As will be appreciated from the foregoing description, the benefits provided by the method and system of the present invention can be realized with existing hardware and relatively simple programming code.

LIST OF REFERENCE NUMERALS

10 Internet
12 Search Engine; Search Engine website
14 Search Engine Web Server
16 Search Engine Database
18 Search Engine Web Page
20 Search Engine Account Management Web Server
22 Search Engine Advertising Account Database
24 Secure Advertising Account Web Page
26 Partner (Website-related services provider); Partner website
27 Affiliate (Website-related services reseller); Affiliate website
28 Web Host Web Server
32 Web Host Account Management Web Server
38A, 38B Clients; Client websites
40 Consumer; Consumer Computer
42 Browser
44A, 44B Client Information
45A, 45B Advertising Account Information
46 Advertising Revenue to Search Engine
48 Shared Revenue to Partner
49 Shared Revenue to Affiliate
50 Opt-in Software Module
52 Manager Software Module
60 Control Panel
62 "Tools" Subpanel
64 Advertising Account Software Icon
70 Client Opt-in Web Page
72 Message Box
74 Opt-in Object
75 User ID Text Box
76 "Submit" Control Button 78 Hyperlink
80 Client Sign-up Form
82 Alternative Client Sign-up Form
84 Subform
86 Advertising Account Prompt Message
88 Opt-in Object (checkbox)
90 Hypertext link:
92 "Continue" Command Button
94 Administrator Control Panel
95 "3<sup>rd</sup> Party Products" Subpanel
96 Affiliate Account Software Icon
98 Affiliate Opt-in Web Page
100 Message Box
102 Affiliate Opt-in Object
104 User ID Text Box
106 "Submit" Control Button
108 Hyperlink
110 Affiliate Sign-up Form
120 Administrator Global Resource Enabler Page
122 Resources Table
124 Resource Listing
126 Resource Check Box
130 Administrator Resource Enabler Page (Windows)
132 Resources Table
134 Resource Listing
136 Resource Check Box
140 Administrator Resource Enabler Page (UNIX/LINUX)
142 Resources Table
144 Resource Listing
146 Resource Check Box
200-230 Programming Code Execution Blocks (Partner or Affiliate)
300-364 Programming Code Execution Blocks (Search Engine)

What is claimed is:

1. A method by which an advertising services provider can establish an Internet advertising services account for a client, the method being carried out with the cooperation of a partner having a partner website visited by the client, the method comprising the steps of:
causing an opt-in object to be displayed on the partner website through which the client may choose to establish an Internet advertising services account without leaving the partner website;
receiving client information from the partner, wherein the client information corresponds to the client who has chosen to establish an Internet advertising services account through the opt-in object; and
using the received client information to establish the Internet advertising services account, wherein the partner has already stored the client information in connection with a website-related services account, and an authorization form is displayed on the partner website when the icon is clicked, whereby the client may authorize the partner to forward the stored client information to the advertising services provider to establish the Internet advertising services account.

2. The method according to claim 1, wherein the partner website includes an account management control panel enabling the client to manage a website-related services account with the partner, and the opt-in object is an icon displayed in the account management control panel.

3. The method according to claim 2, wherein a client information entry form is displayed on the partner website when the icon is clicked, whereby the client may submit the client information to the partner.

4. The method according to claim 1, wherein the partner website includes a client information entry form enabling the client to submit client information to the partner for establishing a website-related services account with the partner, and the opt-in object is displayed on or near the client information entry form.

5. The method according to claim 4, wherein the opt-in object is a check-box.

6. The method according to claim 1, further comprising the steps of:
assigning a username and a password to the Internet advertising services account; and
informing the client of the username and the password.

7. The method according to claim 6, wherein the client information includes an e-mail address of the client, and the client is informed of the username and the password by e-mail.

8. The method according to claim 1, further comprising the step of sharing revenue generated by the Internet advertising services account with the partner.

9. The method according to claim 8, further comprising the step of assigning a unique identification code to the partner.

10. The method according to claim 1, wherein the Internet advertising services account is initially a free trial account established by granting a credit to the client.

11. A method by which an advertising services provider can establish an Internet advertising services account for a client, the method being carried out with the cooperation of a partner having a partner website that sells website-related services and an affiliate having an affiliate website that resells the website-related services, wherein the affiliate website is visited by the client, the method comprising the steps of:
enabling the partner to cause an opt-in object to be displayed on the affiliate website through which the client may choose to establish an Internet advertising services account without leaving the affiliate website;
receiving client information from the affiliate, wherein the client information corresponds to the client who has chosen to establish an Internet advertising services account through the opt-in object; and
using the received client information to establish the Internet advertising services account, wherein the affiliate has already stored the client information in connection with a website-related services account, and an authorization form is displayed on the affiliate website when the icon is clicked, whereby the client may authorize the affiliate to transmit the stored client information to the advertising services provider to establish the Internet advertising services account.

12. The method according to claim 11, wherein the affiliate website includes an account management control panel enabling the client to manage a website-related services account with the affiliate, and the opt-in object is an icon displayed in the account management control panel.

13. The method according to claim 12, wherein a client information entry form is displayed on the affiliate website when the icon is clicked, whereby the client may submit the client information to the affiliate.

14. The method according to claim 11, wherein the affiliate website includes a client information entry form enabling the client to submit client information to the affiliate for establishing a website-related services account with the affiliate, and the opt-in object is displayed on or near the client information entry form.

15. The method according to claim 14, wherein the opt-in object is a check-box.

16. The method according to claim 11, further comprising the steps of:
- assigning a username and a password to the Internet advertising services account; and
- informing the client of the username and the password.

17. The method according to claim 16, wherein the client information includes an e-mail address of the client, and the client is informed of the username and the password by e-mail.

18. The method according to claim 11, further comprising the step of sharing revenue generated by the Internet advertising services account with the partner and the affiliate.

19. The method according to claim 18, further comprising the step of assigning a unique identification code to the partner and to the affiliate.

20. The method according to claim 11, wherein the Internet advertising services account is initially a free trial account established by granting a credit to the client.

21. A computer system for offering advertising services to a client for advertising a client website on the Internet, said computer system comprising:
- at least one memory having program instructions; and
- at least one processor configured to execute the program instructions to perform the operations of:
  - causing an opt-in object to be displayed on a partner website, wherein the opt-in object enables the client to choose to establish an Internet advertising services account while visiting the partner website;
  - transmitting client information from the partner website to a search engine website if the client has chosen, through the opt-in object, to establish an advertising services account; and
  - opening an advertising services account for the client using the client information transmitted to the search engine website, wherein the partner has already stored the client information in connection with a website-related services account, and an authorization form is displayed on the partner website when the icon is clicked, whereby the client may authorize the partner to forward the stored client information to the advertising services provider to establish the Internet advertising services account.

22. The computer system according to claim 21, wherein the at least one processor is configured to execute the program instructions to perform an additional operation of:
- enabling the partner to cause an opt-in object to be displayed on an affiliate website through which the client may choose to establish an Internet advertising services account while visiting the affiliate website.

* * * * *

UNITED STATES PATENT AND TRADEMARK OFFICE
CERTIFICATE OF CORRECTION

| | | |
|---|---|---|
| PATENT NO. | : 7,788,130 B2 | Page 1 of 1 |
| APPLICATION NO. | : 10/954543 | |
| DATED | : August 31, 2010 | |
| INVENTOR(S) | : Feeley et al. | |

It is certified that error appears in the above-identified patent and that said Letters Patent is hereby corrected as shown below:

Title page, item (73), the Assignee should read:

--Pulse 360, Inc., Getzville, NY (US)--.

Signed and Sealed this
First Day of March, 2011

David J. Kappos
*Director of the United States Patent and Trademark Office*